(12) United States Patent (10) Patent No.: US 7,914,279 B2
Ghani et al. (45) Date of Patent: Mar. 29, 2011

(54) METHOD AND APPARATUS FOR INJECTING A GAS INTO A TWO-PHASE STREAM

(75) Inventors: M. Usman Ghani, Bolingbrook, IL (US); Florian Gautier, Route de Vins (FR); Fabienne Chatel-Pelage, Chicago, IL (US); Frederick W. Giacobbe, Naperville, IL (US); Pavol Pranda, Lisle, IL (US); Nicolas Perrin, Bourg la Reine (FR)

(73) Assignee: American Air Liquide, Inc., Fremont, CA (US)

( * ) Notice: Subject to any disclaimer, the term of this patent is extended or adjusted under 35 U.S.C. 154(b) by 1096 days.

(21) Appl. No.: 11/206,730

(22) Filed: Aug. 18, 2005

(65) Prior Publication Data

US 2006/0040223 A1 Feb. 23, 2006

Related U.S. Application Data

(63) Continuation-in-part of application No. 10/758,607, filed on Jan. 15, 2004, now Pat. No. 7,066,728.

(60) Provisional application No. 60/441,508, filed on Jan. 21, 2003, provisional application No. 60/602,442, filed on Aug. 18, 2004, provisional application No. 60/605,312, filed on Aug. 26, 2004.

(51) Int. Cl.
 *F23M 3/00* (2006.01)
(52) U.S. Cl. ............................ 431/9; 431/350; 431/351
(58) Field of Classification Search .............. 431/9, 351, 431/8, 350; 239/132, 424.5, 425
See application file for complete search history.

(56) References Cited

U.S. PATENT DOCUMENTS 3,313,535 A * 4/1967 Hopkins .................... 239/132.3
3,758,090 A 9/1973 Shimotsuma et al.
(Continued)

FOREIGN PATENT DOCUMENTS

EP 0474524 7/1991
(Continued)

OTHER PUBLICATIONS

Garrido G.F., Perkins A.S., Ayton J.R., Upgrading Lime Recovery With $O_2$ Enrichment, CPPA Conference, Montreal, Jan. 1981.

(Continued)

*Primary Examiner* — Alfred Basichas
(74) *Attorney, Agent, or Firm* — Christopher J. Cronin

(57) ABSTRACT

Apparatus and methods for improved combustion of oxygen and a mixture of a non-gaseous fuel, which includes providing: 1) a source of a mixture of non-gaseous fuel and conveying gas; 2) a source of oxygen; 3) a burner operatively associated with a combustion chamber; 4) a fuel duct in fluid communication with the source of mixed non-gaseous fuel and conveying gas; 5) a tubular oxygen lance fluidly communicating with the source of oxygen; and 6) at least two injection elements in fluid communication with the source of oxygen. The fuel duct includes a portion that extends along an axis towards the burner. The lance is disposed along the axis and has a diameter D. The injection elements are configured to inject oxygen into, and mix therewith, a flow of the mixture upstream of, or at, the burner. At least one of the injection elements receives oxygen from the lance. The injection elements are spaced apart by a distance X, which is greater than the length of diameter D.

4 Claims, 28 Drawing Sheets

U.S. PATENT DOCUMENTS

| | | | |
|---|---|---|---|
| 4,329,932 | A | 5/1982 | Takahashi et al. |
| 4,556,384 | A | 12/1985 | Laurenceau et al. |
| 4,591,331 | A | 5/1986 | Moore |
| 5,291,841 | A | 3/1994 | Dykema |
| 5,333,840 | A | 8/1994 | Skold et al. |
| 5,356,213 | A | 10/1994 | Arpentinier |
| 5,664,733 | A | 9/1997 | Lott |
| 5,762,007 | A | 6/1998 | Vatsky |
| 5,775,446 | A | 7/1998 | Lott |
| 5,950,547 | A | 9/1999 | Wachendorfer |
| 6,090,182 | A | 7/2000 | Riley |
| 6,142,765 | A | 11/2000 | Ramaseder et al. |
| 6,319,458 | B1 | 11/2001 | Jung et al. |
| 2002/0144636 | A1 | 10/2002 | Tsumura et al. |
| 2003/0099913 | A1 | 5/2003 | Kobayashi et al. |
| 2004/0065849 | A1 | 4/2004 | Larsen |
| 2004/0074427 | A1 | 4/2004 | Kobayashi et al. |
| 2004/0185404 | A1 | 9/2004 | Chatel-Pelage et al. |
| 2005/0005885 | A1 | 1/2005 | Battlogg |

FOREIGN PATENT DOCUMENTS

| | | | |
|---|---|---|---|
| EP | 576869 | | 6/1993 |
| EP | 0852315 | | 4/1997 |
| EP | 1416221 | | 7/2003 |
| FR | 875509 | | 9/1942 |
| FR | 2591509 | * | 6/1987 |
| FR | 2681417 | | 9/1991 |
| JP | 60 023717 | | 2/1985 |
| JP | 5112806 | | 10/1991 |
| JP | 6100912 | | 9/1992 |
| JP | 11092807 | | 9/1997 |
| JP | 11343511 | | 6/1998 |
| JP | 2000/160216 | | 11/1998 |
| JP | 2002/121609 | | 8/2000 |
| WO | WO 99/08045 | | 2/1999 |
| WO | WO 02/103241 | | 12/2002 |
| WO | WO 2005/005885 | | 1/2005 |

OTHER PUBLICATIONS

Sarofin, A.F. et al., "Strategies for Controlling Nitrogen Oxide Emissions during Combustion of Nitrogen-bearing fuels", Proceedings of the 69th Annual Meeting of the A.I.CH.E., Chicago, Nov. 1976.

K. Moore, W. Ellison, "Fuel Rich Combustion, A Low Cost $NO_x$ Control Means for Coal-fired Plants," 25th International Technical Conference on Coal Utilization & Fuel Systems, Clearwater, Florida, Mar. 2000.

PCT/IB2004/000089 International Search Report.

Chatel-Pelage, et al., Oxygen-Enrichment for NOx Control in Coal-Fired Utility Boilers, The 29th International Technical Conference on Coal Utilization and Fuel Systems, Clearwater, FL, USA, 2004.

Marin, et al., "Low-Oxygen Enrichment in Coal-Fired Utility Boilers," The 28th International Technical Conference on Coal Utilization and Fuel Systems, Clearwater, FL, USA, 2003.

Mitchell, S. C., "NOx in pulverized Coal Combustion," IEA Clean Coal Center Report CCC/05, 1998 (abstract).

Van Der Lans, et al., "Influence of Process Parameters on Nitrogen Oxide Formation in Pulverized Coal Burners," Prog. Energy Combust. Sci. vol. 23, p. 349-377, 1997.

\* cited by examiner

METHOD AND APPARATUS FOR INJECTING A GAS INTO A TWO-PHASE STREAM

CROSS-REFERENCE TO RELATED APPLICATIONS

This application is a continuation-in-part of U.S. non-provisional application Ser. No. 10/758,607, filed Jan. 15, 2004, now U.S. Pat. No. 7,066,728 which claims priority from U.S. provisional application No. 60/441,508, filed Jan. 21, 2003. This application claims the benefit under 35 U.S.C. §119(e) to provisional application No. 60/602,442, filed Aug. 18, 2004, and provisional application No. 60/605,312, filed Aug. 26, 2004, the entire contents of each of which are incorporated herein by reference.

BACKGROUND

Mixing two gaseous streams is a very common process in a variety of industrial applications. Examples include oxygen enrichment of a premixed fuel and air stream or oxygen enrichment of secondary, tertiary and over-fire air streams in industrial furnaces and boilers. Oxygen enrichment of gaseous fuel streams has been successfully practiced in a number of industrial processes, such as glass melting, lime and cement kilns, and steel manufacturing, among many others. Coal, on the other hand, is the most abundant fossil fuel currently available. Most of the power generated in the world uses coal as the fuel.

The enrichment of a particle-laden stream, such as a coal/air stream, with oxygen poses additional challenges. These challenges arise due to a large number of factors, as described below.

Firstly, due to safety concerns, high oxygen concentrations close to the walls of the burner primary duct or oxygen lance should be avoided.

Secondly, the coal particles usually have a non-uniform particle size distribution. Most utilities, with coal-fired power plants, use a size fraction that ranges from about 75-120 μm. The coal particle trajectories in the particle-laden stream deviate from the gas streamlines. The larger particles deviate more, whereas the smaller particles follow gas streamlines more closely. In addition, the bends in the line lead to a phenomenon known as "rope phenomena." As a result, the particle loading is not uniform across the cross-section of the pipe.

Another challenge is the effect of oxygen injection on the particle trajectories. The injection may disturb these trajectories and could lead to a non-uniform loading of the particles in the stream. This could lead to pockets that are fuel lean. This, in turn, has a detrimental effect on the NO, emissions, which tend to increase under such conditions.

Non-uniform distribution of particles downstream the oxygen injection nozzle could lead to fuel lean pockets/zones at the burner primary air duct outlet. This, in turn, has a detrimental effect on the NO, emissions, which tend to increase under such conditions. This negative effect of non-uniform particles loading could be avoided if good oxidant/fuel mixing are achieved. In other words, the oxygen distribution should match the fuel distribution at the burner primary air duct outlet. That way, and in the first stages of coal combustion, oxygen and particles will be able to closely react during coal devolatilization (this reaction is required to decrease the $NO_x$ emissions).

Avoiding local increase of axial velocity at the burner outlet is a new challenge raised by oxygen injection. As increased residence times of both oxygen and fuel particles in the hot fuel rich zone are key parameters governing $NO_x$ emissions reduction, accelerating the flow at the burner outlet will lead to $NO_x$ emissions increase.

Currently, there are a number of injector designs that are used for mixing of two gaseous streams, including that disclosed in U.S. Pat. No. 5,356,213, the contents of which are incorporated herein by reference. This injector design, promoted by Air Liquide under the name Oxynator®, is designed to minimize mixing distance and to prevent high oxygen concentrations near the pipe walls. Oxygen flows radially from the center of the pipe and tangentially swirls in the air stream, improving mixing efficiency.

Other designs include those having a number of nozzle openings in order to efficiently mix two gaseous streams. Typical examples are disclosed in U.S. Pat. Nos. 5,664,733, 5,775,446, and 5,762,007.

For the coal-air flow, it is important to understand that the primary air is surrounded by a secondary air stream, which is injected in the furnace with a swirl to achieve mixing of the secondary air with the primary coal-air stream. The design of these burners is often relatively complex. New designs by Babcock and Wilcox now propose a transition zone between the primary and secondary air streams. These burners, however, must be retrofitted with some injection devices to enrich the primary coal-air stream with oxygen.

Particular pulverized coal burners are disclosed in U.S. Pat. No. 4,556,384. This patent shows various methods for injecting oxygen to enrich the primary coal-air stream. This burner is designed to operate in a stable manner with no risk of explosion with pure oxygen or air highly enriched with oxygen as the reactant. Streams of oxygen and fuel (pulverized coal) are delivered through concentric pipes (concentric tubes and annular rings).

Some other designs are those that are disclosed by U.S. Published Patent Application No. 2004-0074427 A1.

Additionally, four particular lance designs were proposed in U.S. Published Patent Application No. 2004-0185404 A1, which was published on Sep. 23, 2004, and contents of which are incorporated herein by reference. These recent designs, however, suffer from the drawbacks that the oxygen injection lead to a particle-depleted zone and does not allow for complete mixing of oxygen with the coal-air streams.

SUMMARY

The invention provides a system for improving combustion of oxygen and a mixture of a non-gaseous fuel and conveying gas for improved combustion in a combustion chamber. The system includes: 1) a source of a mixture of non-gaseous fuel and conveying gas; 2) a source of oxygen; 3) a burner operatively associated with a combustion chamber; 4) a fuel duct in fluid communication with the source of mixed non-gaseous fuel and conveying gas; 5) a tubular oxygen lance fluidly communicating with the source of oxygen; and 6) at least first and second injection elements in fluid communication with the source of oxygen. The fuel duct includes a portion that extends along an axis towards the burner. The lance is disposed along the axis and has a diameter D. The at least first and second injection elements are configured to inject oxygen into, and mix therewith, a flow of the mixture upstream of, or at, the burner. At least one of the first and second injection elements receives oxygen from the lance. The first and second injection elements are spaced apart by a distance X, which is greater than the length of diameter D.

The invention also provides a method of improved combustion of oxygen and a mixture of a non-gaseous fuel and conveying gas for improved combustion in a combustion chamber. Utilizing the system as described above, a mixture of the non-gaseous fuel and the conveying gas is first allowed to flow into the fuel duct. Oxygen is then allowed to flow from the first and second injection devices, such that the oxygen and the mixture of non-gaseous fuel and conveying gas are mixed. The thus-mixed oxygen, non-gaseous fuel, and conveying gas is then combusted within the combustion chamber.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
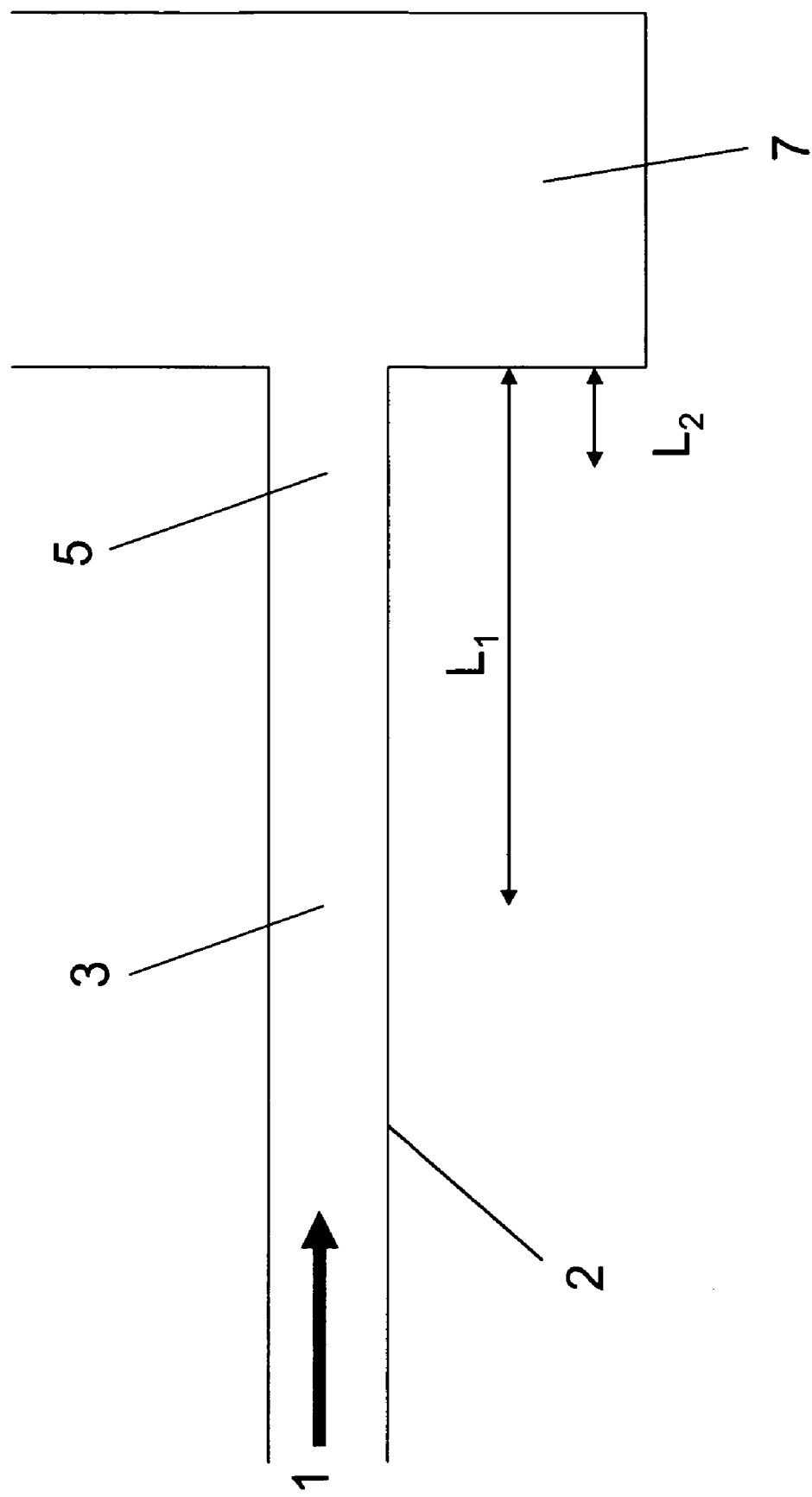
FIG. 1 is a schematic of one embodiment with two oxygen injections, wherein one injection point is upstream of the other.

The method and system according to the invention achieve improved mixing of oxygen injected into a stream of mixed non-gaseous fuel and a conveying gas. Improved mixing leads to improved combustion. The injection is accomplished using at least two injection elements that are spaced apart to allow greater mixing over a shorter distance.

The term, "oxygen", is defined as a gas or gas mixture containing at least 90% by volume of oxygen.

While an oxygen lance extending down an axially extending fuel duct feeds oxygen to at least one of the injection elements, it may feed one or more injection elements. At least two of the injection elements may lie roughly in a same plane and axial position with respect to the axis of the fuel duct. Alternatively, at least two of the injection elements lie at different axial positions with respect to the fuel duct axis. In either case, this leads to enhanced mixing of the oxygen into the mixture of non-gaseous fuel and conveying gas.

The oxygen lance has a diameter D. In contrast to other oxygen injection configurations, at least two of the injection elements are spaced apart from one another by a distance greater than D. This greater distance avoids local high concentrations of oxygen because the oxygen fed into the stream of mixed non-gaseous fuel and conveying gas is spread out.

One benefit of the invention is realized when oxygen is injected at two different axial positions because it does not require the use of "oxygen clean" piping and components. Ordinarily, an oxygen concentration above 25% in a fuel stream requires the use of piping and components that are "oxygen clean". This requirement may be avoided by injecting oxygen into the fuel stream with a first injection element in an amount such that the overall oxygen concentration remains below 25%. A remaining quantity of oxygen can then be injected with a second injection element axially spaced from the first injection element (downstream of the first injection element) to bring the overall concentration of oxygen to a concentration greater than 25%.

The invention also includes several new injection element designs. These allow effective mixing of oxygen and the two-phase flow of combined non-gaseous fuel and conveying gas over a relatively short distance while causing minimal disturbance to the two-phase flow. For solid fuels, the particle loading and the species concentrations at the exit of the injector are uniform.

The fuel used in the invention is present in either solid or liquid form. Suitable solid fuels include coal, pet coke, biomass, and the like. Suitable liquid fuels include hydrocarbons, such as resid oils. The preferred fuel is coal. The preferred application of this invention is in a coal-fired utility boiler in the power generation industry. Preferably, the conveying gas is air.

Due to safety concerns, the injection of oxygen in a premixed fuel-oxidant stream poses some challenges. In the case of coal-fired boilers, oxygen injection for enrichment of the primary air-coal stream is delayed until very close to the boiler inlet in order to lessen the chance that the fuel will ignite earlier than desired. However, this provides relatively less distance and time for the oxygen and the primary air-coal stream to adequately mix. This could potentially result in local pockets of fuel-lean mixture, and as a result, could increase $NO_x$ emissions.

The characteristics and advantages of the present invention will be apparent to those skilled in the art from the detailed description of the preferred embodiments, which are discussed below with reference to the attached drawings.

As illustrated in FIG. 1, two injection elements 3, 5 at different axial positions along the fuel duct 2 could be used. While two injections are depicted, it is understood that the invention is not limited to just two. Injection of partial quantities of oxygen at each location allows the oxygen to effectively mix with the non-gaseous fuel/conveying gas stream 1. The amount of the injection at each location is determined based upon the process and operations needs and requirements. The remaining final quantity of the oxygen is then injected close to the exit of the fuel duct 2 upstream of combustion chamber 7 in order to achieve the desired concentration. Injection over multiple locations would gradually increase the concentration levels in the stream as it flows towards the exit.

As an example, a utility boiler using coal as fuel is considered. A final oxygen concentration of more than 25% in the primary air-coal stream is intended. Ordinarily, an oxygen concentration above 25% in the primary air-coal stream requires the use of piping and components that are "oxygen clean". This requirement may be avoided by injecting oxygen into the primary air-coal stream with injection element 3 in an amount at a distance $L_1$ from the exit, such that the overall oxygen concentration remains below the 25%. The remaining quantity is injected with injection element 5 relatively close to the exit at a distance $L_2$ from the exit. This brings the overall concentration of oxygen to the desired level greater than 25%. In this aspect of the invention, $L_1$ is greater than $L_2$. This double injection provides sufficient distance and time for the oxygen injected far upstream to mix well with the primary air-coal stream. The second injection allows additional mixing over the remaining distance and yields the desired oxygen level.

Another aspect of the invention includes relocating the coal diffuser, impellers, concentrators, and/or other bluff-body devices located in the primary air duct to a position downstream of the oxygen injection location. This configuration uses the turbulence introduced by these devices to further mix the oxygen with the non-gaseous fuel/conveying gas. Alternatively, the oxygen injection may be performed upstream the existing location(s) of one or more of these devices. Still another retrofit application includes addition of a second coal diffuser downstream of the oxygen injection.

The oxygen lance length has a significant effect on oxygen jet injection and behavior. Because the lance is cooled by the cold flow of oxygen to be injected into the fuel duct, it is possible to extend it after the actual position of oxygen injection.

Radially Injecting Injection Elements Designs:

One configuration of the invention includes locating at least one injection element at the end of the oxygen lance in the fuel duct. A second or more injection elements could be located in a portion of the oxygen lance upstream the end or could be located elsewhere.

Figure 2:
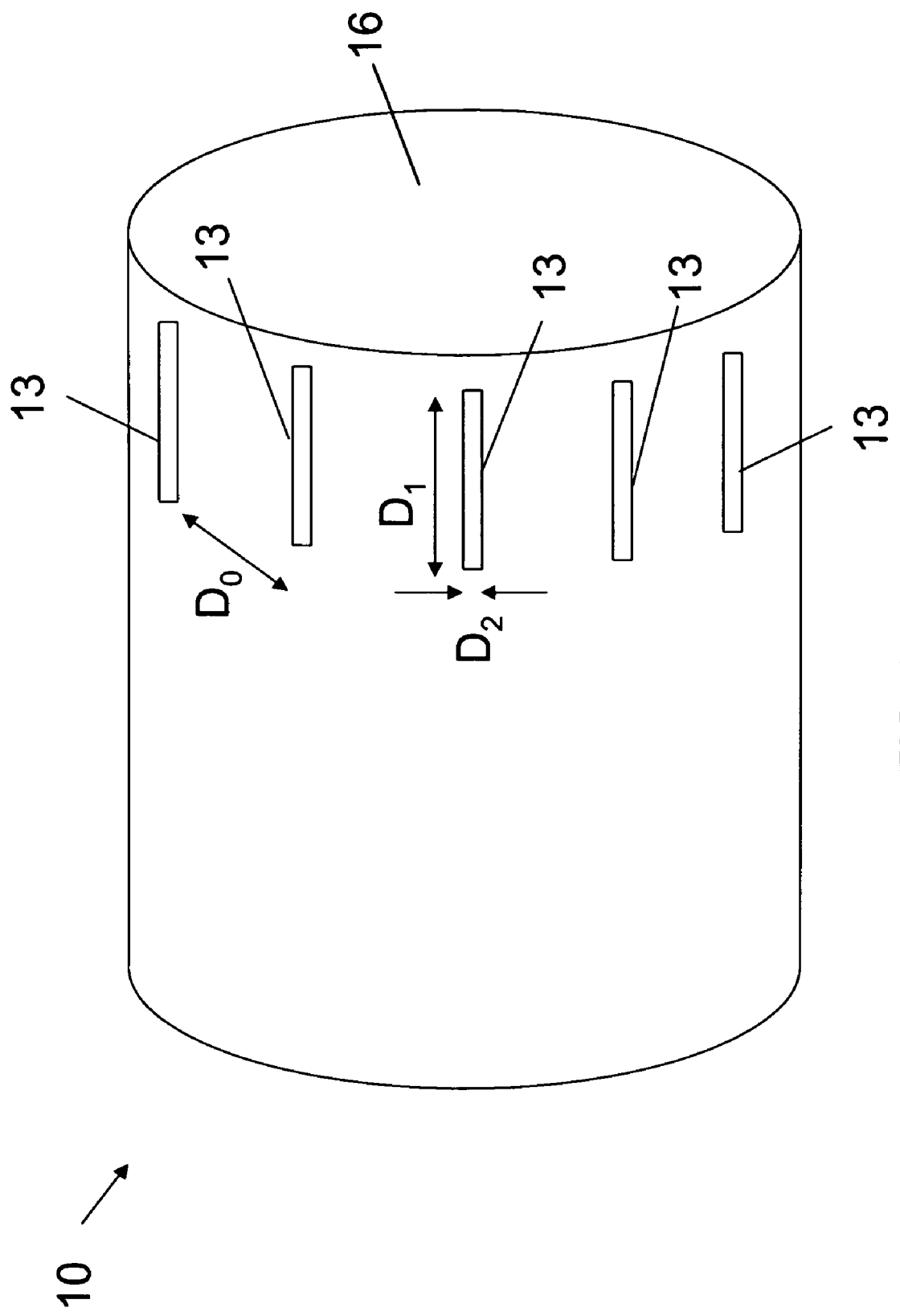
FIG. 2 is a perspective view of a tubular injection element having rectangular apertures.
Figure 3B:
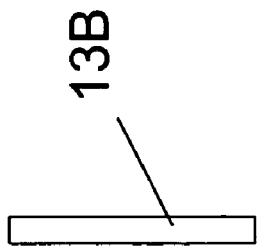
FIG. 3B is a schematic of a rectangular aperture for use in a tubular injection element.
Figure 3D:
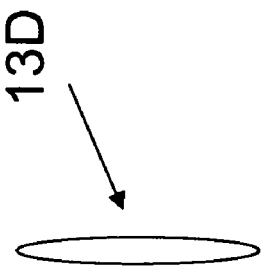
FIG. 3D is a schematic of an elliptical aperture for use in a tubular injection element.
Figure 3A:
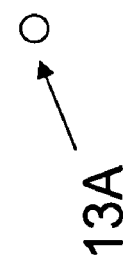
FIG. 3A is a schematic of a circular aperture for use in a tubular injection element.
Figure 3C:
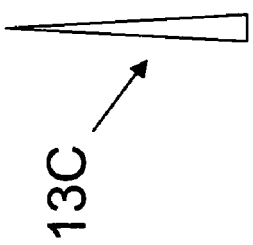
FIG. 3C is a schematic of a triangular aperture for use in a tubular injection element.

As illustrated in FIG. 2, one injection element 10 is a tube having a closed end 16 and plurality of rectangular apertures 13. This design provides radial injection from the circumferential face of the injection element 10.

The length, $D_1$, and width, $D_2$, of these apertures, as well as the circumferential arc distance, $D_0$, between two adjacent apertures may be varied to control the momentum ratio J (ratio of the oxygen jet momentum to the momentum of the stream of non-gaseous fuel/conveying gas). $D_1$, $D_2$, and $D_0$ also control the penetration of the injection gas into the primary stream. A small $D_2/D_1$ ratio (streamlined rectangular apertures) will minimize the perturbation to solid fuel particles, such as coal. A big $D_2/D_1$ ratio (bluff-body slots) will have a greater influence on the solid phase and will push solid fuel particles, such as pulverized coal, away from the centerline of the burner primary air duct. Those two different aspect ratios will lead to different distribution of particles and oxygen at the duct outlet.

Those three parameters, $S_1$, $D_1$, and $D_2$, in turn, control the penetration of the injection gas into the primary stream. A small $D_2/D_1$ ratio (streamlined slots) will minimize the perturbation to the solid phase. A big $D_2/D_1$ ratio (bluff-body slots) will have a greater influence on the solid phase and will push the coal particles away from the centerline of the burner primary air duct. Those two different aspect ratios will lead to different distribution of particles and oxygen at the duct outlet. As shown in FIGS. 3A-3D, the slot shape itself could be circular, rectangular, triangular, or elliptical, respectively.

Figure 4:
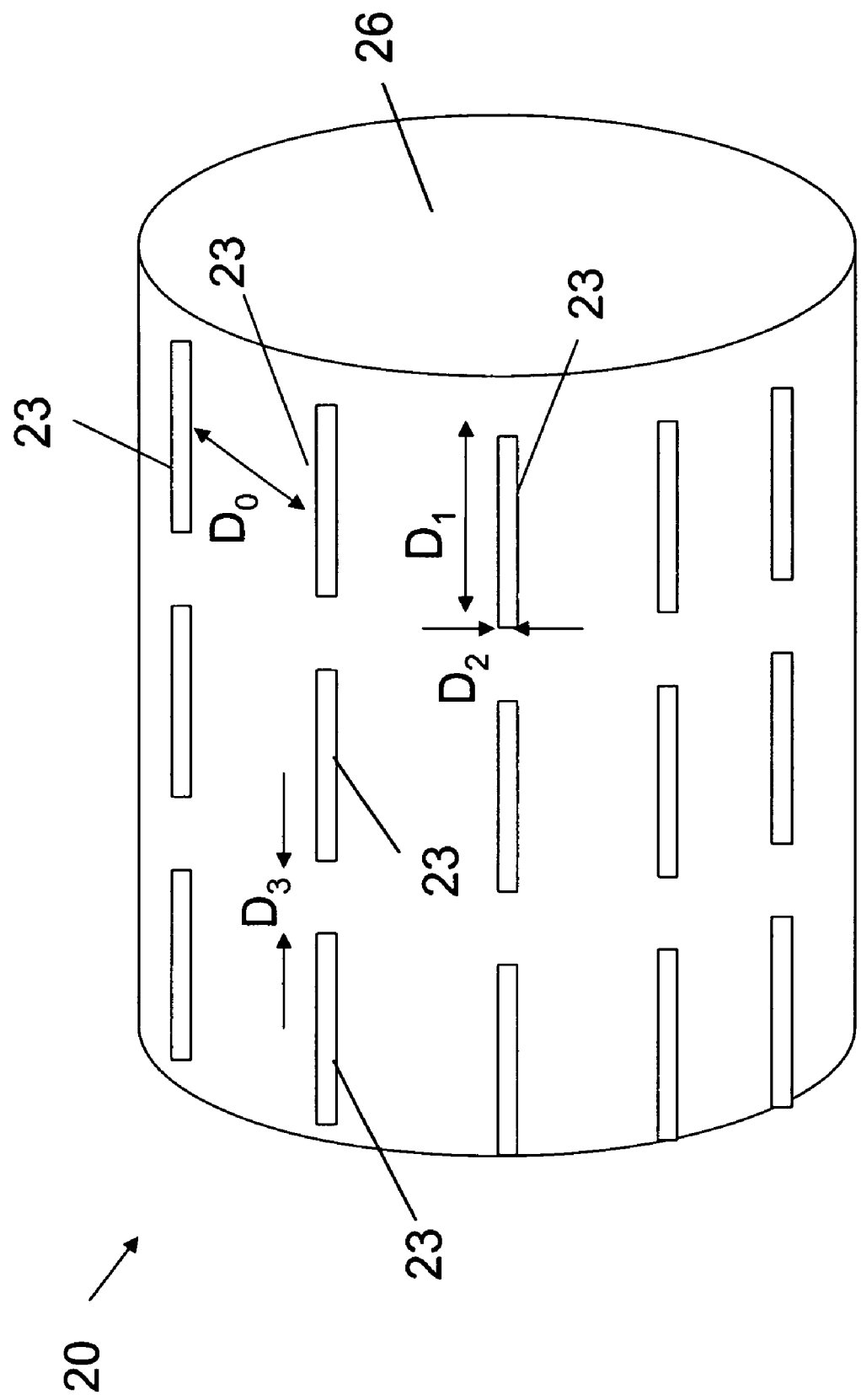
FIG. 4 is a perspective view of a tubular injection element having three sets of rectangular apertures.

As depicted in FIG. 4, the injection element 20 includes apertures 23 arranged in axially extending rows along the axis of the injection element 20. This pattern performs a better mixing if the axial distance $D_3$ between two adjacent apertures 23 in a same row is sufficiently large. The dimension $D_3$ between the apertures 23 could be the same or could vary in the axial direction towards the closed end 26.

Figure 5:
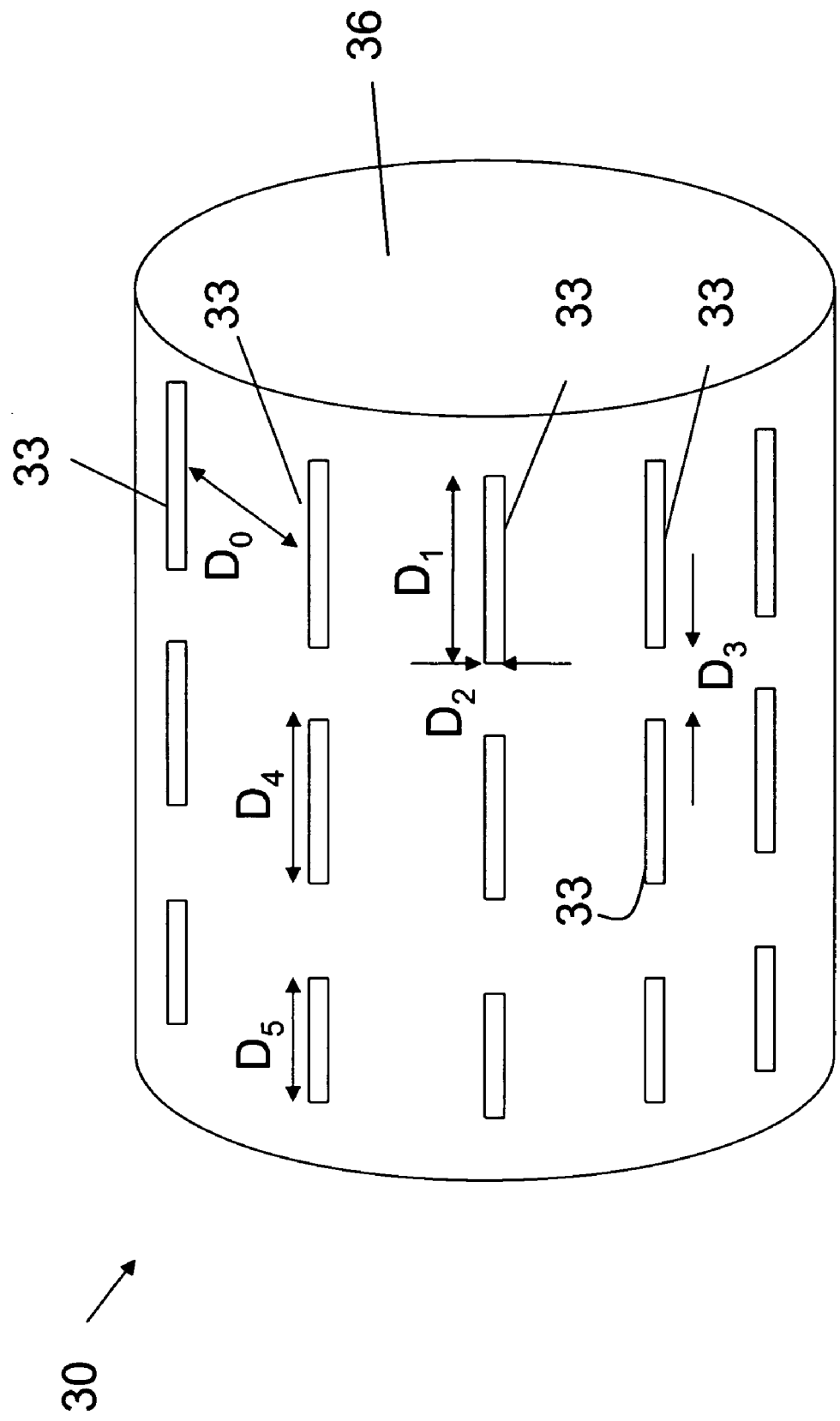
FIG. 5 is a perspective view of a tubular injection element having three sets of decreasingly shorter rectangular apertures.

As best illustrated in FIG. 5, the length dimensions $D_1$, $D_4$, and $D_5$ of the apertures 33 in injection element 30 may vary from short to long going in the direction of the closed end 36. Alternatively, these length dimensions could vary in any order from short to long, long to short, long to short and then back to long, short to long and then back to short, and other permutations. In addition, the dimensions $D_1$ or $D_2$ could also vary in the azimuthal (radial) direction. This offers more precise control over the penetration of the injection gas into the primary stream. Finally, $D_3$ can be tailored to the conditions of each process to optimize mixing and minimal redistributions of particles.

Figure 6:
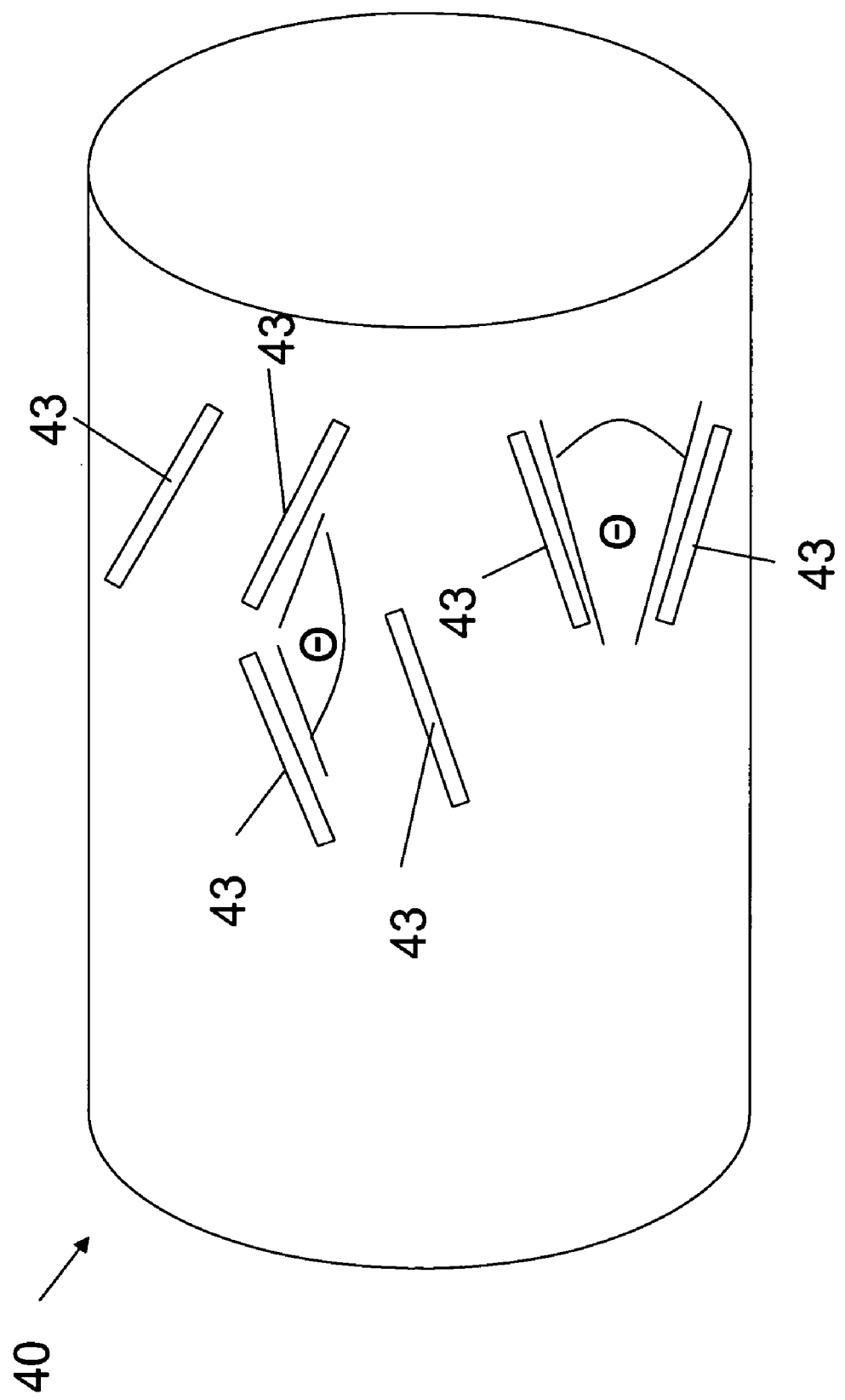
FIG. 6 is a perspective view of a tubular injection element having rectangular apertures arranged in a staggered pattern.

As shown in FIG. 6, the apertures 43 in injection element 40 need not extend in the axial direction. Rather, they may be staggeredly disposed at different angles Θ with respect to one another. Θ can vary from less than 180° (streamlined slots/axial slots) to 90° (bluff-body slots/radial slots).

Figure 7:
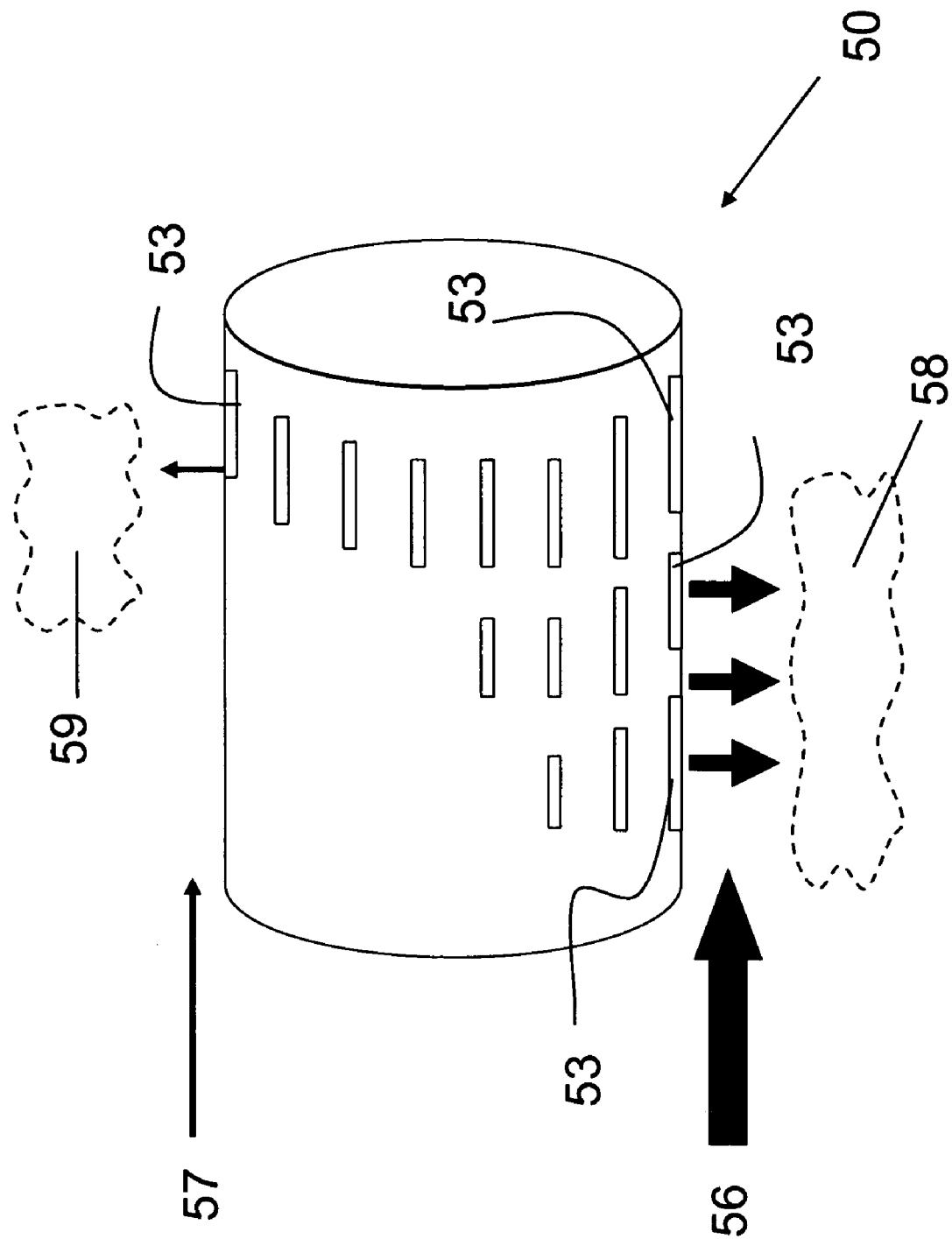
FIG. 7 is a perspective view of a tubular injection element having a vertically non-uniform distribution of rectangular apertures.

As depicted in FIG. 7, the injection element 50 need not have a uniform distribution of apertures 53 in the azimuthal direction. As discussed previously, in coal-fired boilers, the coal particle loading is not always uniform throughout the cross-section (sometimes due to the so-called "roping phenomenon"). In the case of a solid fuel, the particle concentration in the stream of non-gaseous fuel/conveying gas 56 at the bottom of the injection element 50 may be higher than the same in the stream of non-gaseous fuel/conveying gas 57 at the top of the injection element 50. In this figure, the thickness of arrows represents the loading of particles in the gas stream. The advantage offered by this is that more oxygen could be introduced in the locations where particle loading is higher 58 than locations where particle loading is lower 59. This will reduce the likelihood of creating local fuel-lean pockets that lead to higher levels of $NO_x$. With respect to this problem and solution, the particle loading distribution could easily be determined by experimental or modeling studies.

Similar to the injection element designs 10, 20, 30, 40, the apertures 53 may be staggered and vary in size in the axial and azimuthal directions. The distance between apertures 53, the number of rows of apertures 53, or the surface area of apertures 53 could also be varied.

This injection element 50 has a particularly beneficial application to coal-fired boilers whose burner geometry include coal concentrators or splitters (identified technique in the prior art for reducing $NO_x$ emissions from pulverized coal burners). Varying levels of oxygen injection may be located to achieve higher concentration of oxygen in coal richer zones. As a result, the equivalence ratio between coal and oxygen can be controlled in the coal richer zone (concentrated zone) as well as in the coal leaner zones.

As shown in FIGS. 3A-D, the apertures 13A-13B can have various shapes such as circular, rectangular, triangular, elliptical, and still others. In addition, all the aperture geometries and arrangements described in FIGS. 2-7 above are suitable for oxygen injection into an annular section surrounding the fuel duct (from an inner wall of the fuel duct).

As depicted in FIGS. 3A-D, the apertures 13A-13D for each of the foregoing tubular designs can have various shapes such as circular, rectangular, triangular, elliptical, and still others.

Aerodynamic Injection Element Designs:

As depicted in FIGS. 8-12, the injection element 100, 110, 120, 130, 140 may have an aerodynamic closed end 106, 116, 126, 136, 146. An aerodynamic shape tends to reduce recirculation of the stream of non-gaseous fuel and conveying gas, and in the case of solid fuels creation of a particle deficient and low/reverse velocity zone in the wake of the injection element 100, 110, 120, 130, 140.

Figure 8:
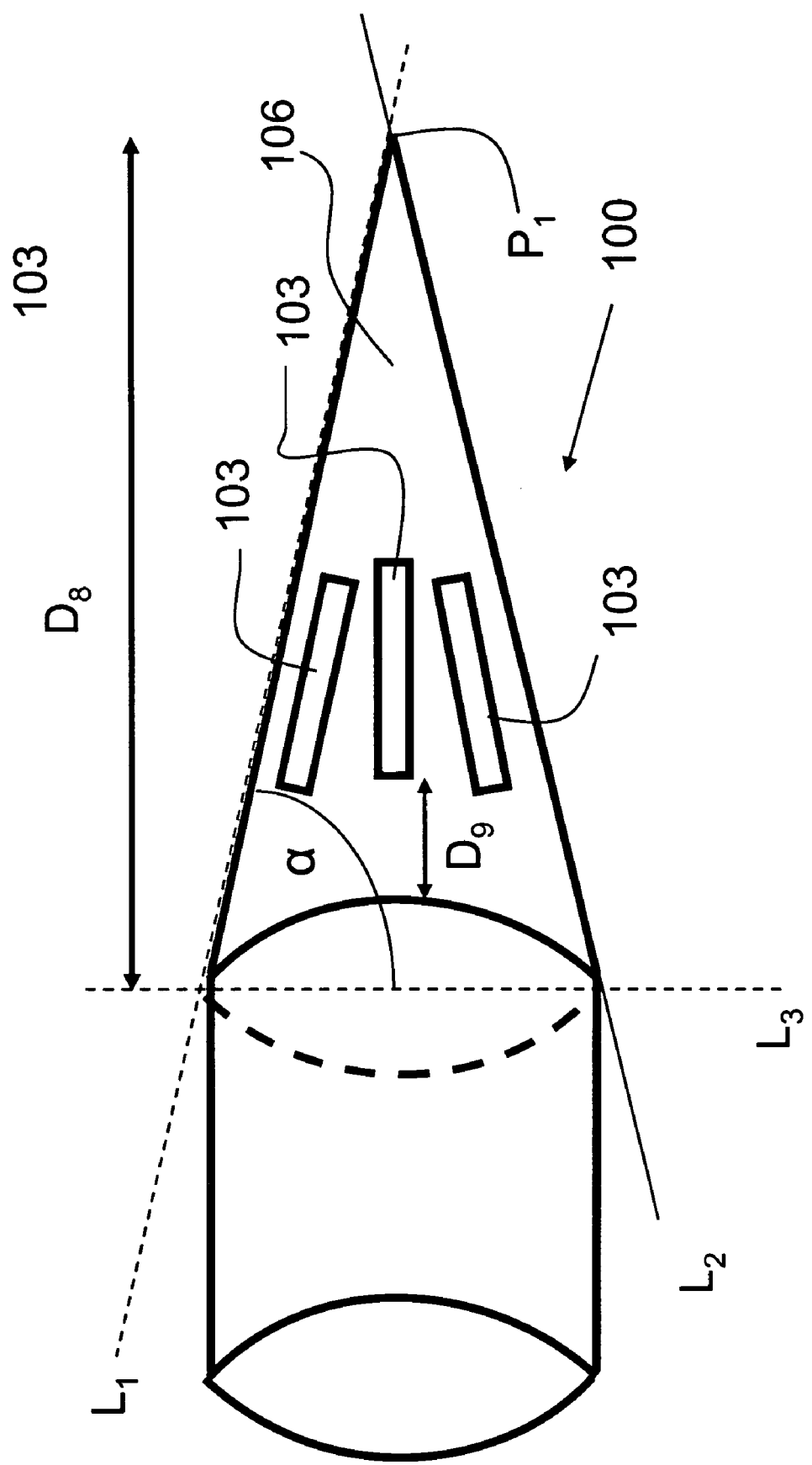
FIG. 8 is a perspective view of a tubular injection element having an aerodynamic pointed tip with rectangular apertures.

Referring to the injection element 100 of FIG. 8, rectangular apertures 103 could be added to closed end 106 in all the permutations described in FIGS. 1-7. The closed end 106 could be pointed, and terminate at point $P_1$. The distances $D_8$ and $D_9$ and the angle α defined by lines $L_1$ and $L_2$ could be varied in order to optimize the mixing in a shortest distance and to cause least disturbance to the non-gaseous fuel.

Referring to the injection element 100 of FIG. 8, rectangular apertures 103 could be added to closed end 106 in all the permutations described in FIGS. 1-7. The closed end 106 could be pointed, and terminate at point $P_1$ at the intersection of lines $L_1$ and $L_2$. The distances $D_8$, and $D_9$, and the angle α defined by lines $L_1$, and $L_3$, could be varied in order to optimize the mixing in a shortest distance and to cause least disturbance to the non-gaseous fuel.

Figure 9:
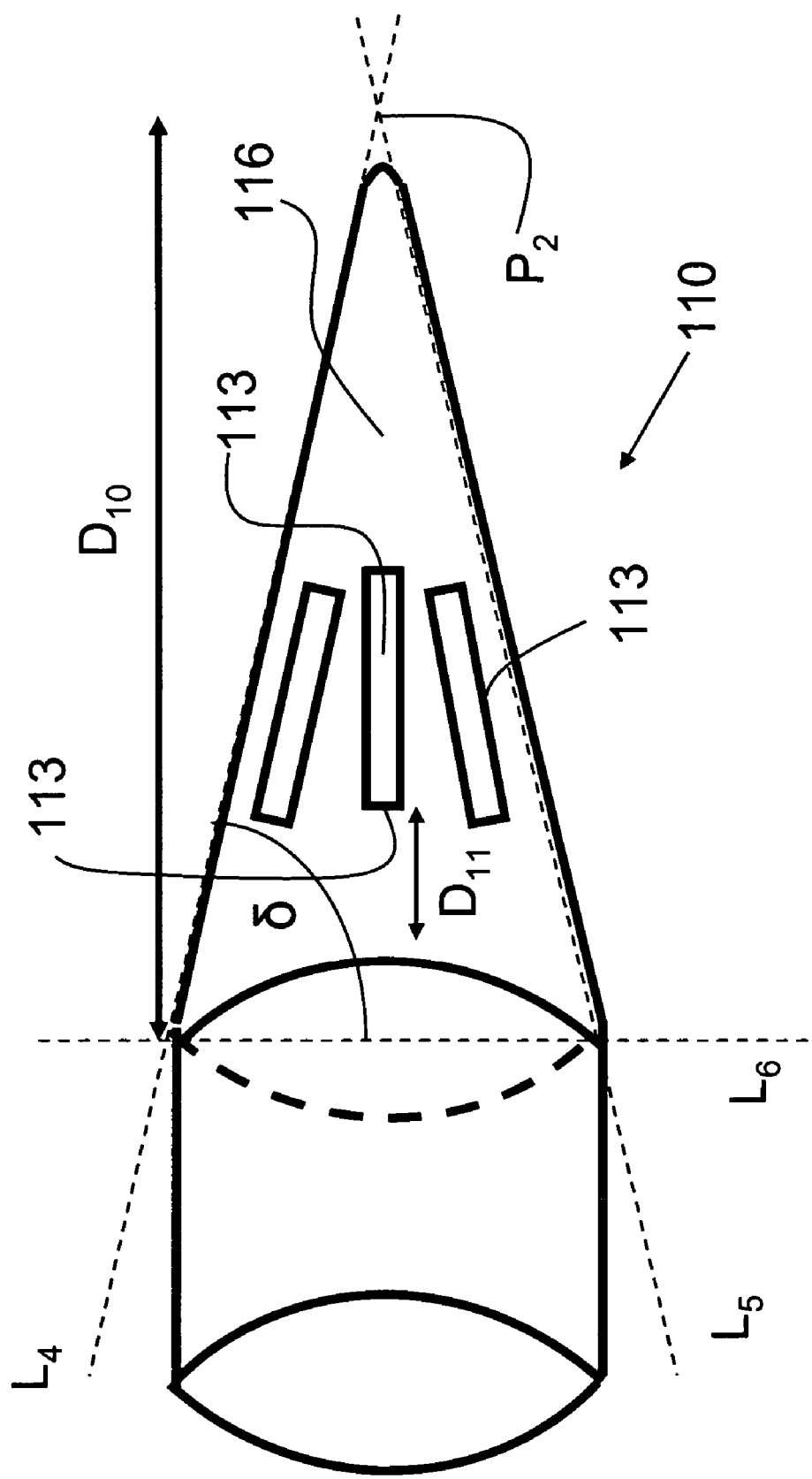
FIG. 9 is a perspective view of a tubular injection element having an aerodynamic rounded tip with rectangular apertures.

Referring to the injection element 110 of FIG. 9, rectangular apertures 113 could be added to closed end 116 in all the permutations described in FIGS. 1-7. The closed end 116 could be rounded, instead of extending to point $P_2$ at the intersection of lines $L_4$ and $L_5$. The distances $D_{10}$ and $D_{11}$, and the angle δ defined by lines $L_4$ and $L_6$ could be varied in order to optimize the mixing in a shortest distance and to cause least disturbance to the non-gaseous fuel.

Figure 10:
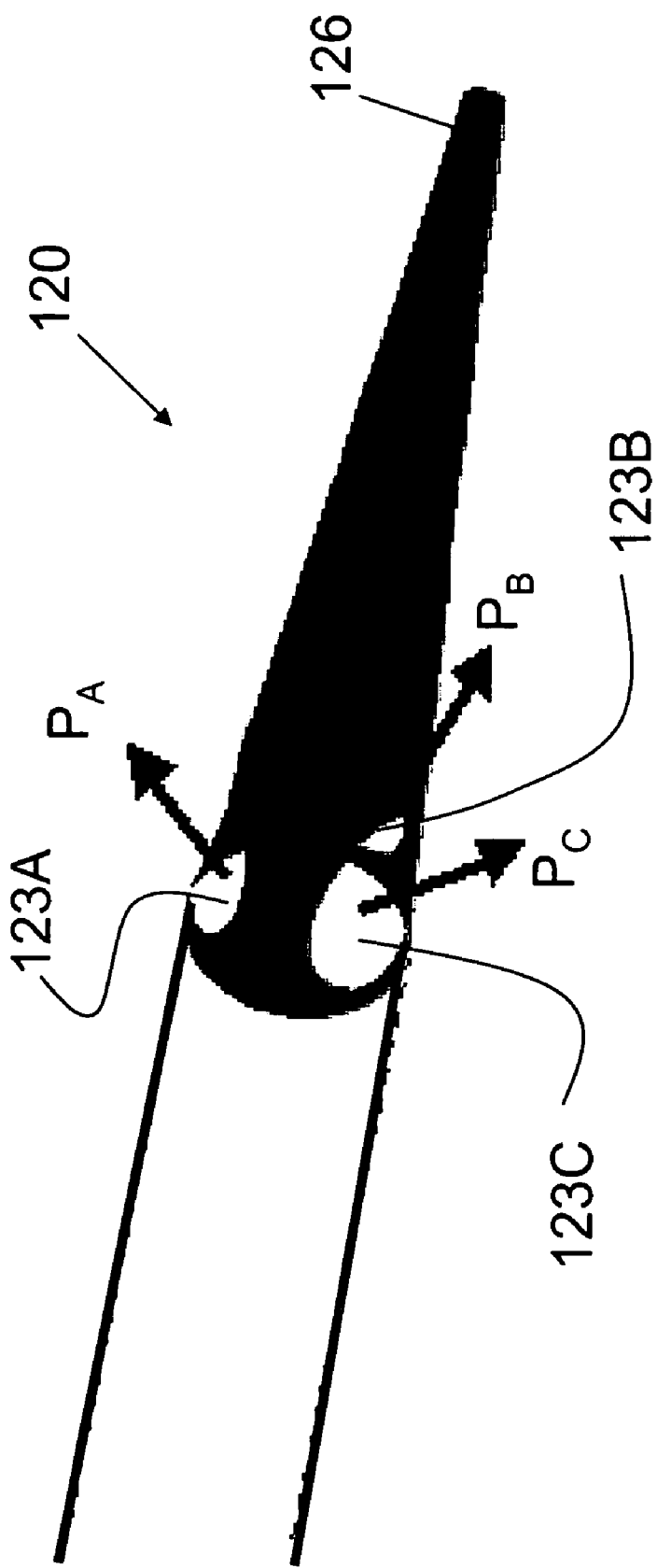
FIG. 10 is a perspective view of a tubular injection element having an aerodynamic rounded tip with elliptical apertures.

As illustrated in FIG. 10, elliptical (or circular) apertures 123A, 123B, 123C may be present on injection element 120. The injection element 120 extends to a rounded tip 126. Each of apertures 123A, 123B, and 123C is configured to inject a stream of oxygen $P_A$, $P_B$, $P_C$ into the mixed stream of non-gaseous fuel and conveying gas at an angle to the axis of the oxygen lance.

Figure 11:
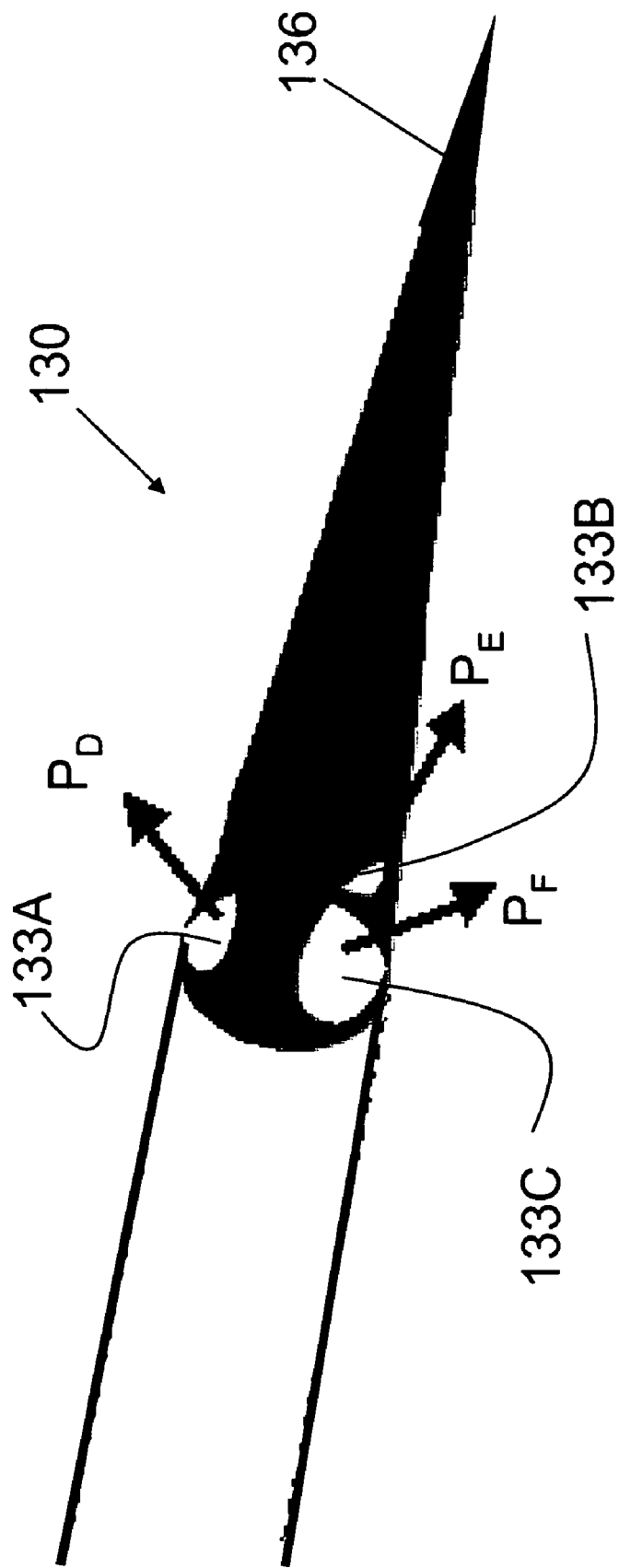
FIG. 11 is a perspective view of a tubular injection element having an aerodynamic pointed tip with elliptical apertures.
Figure 12:
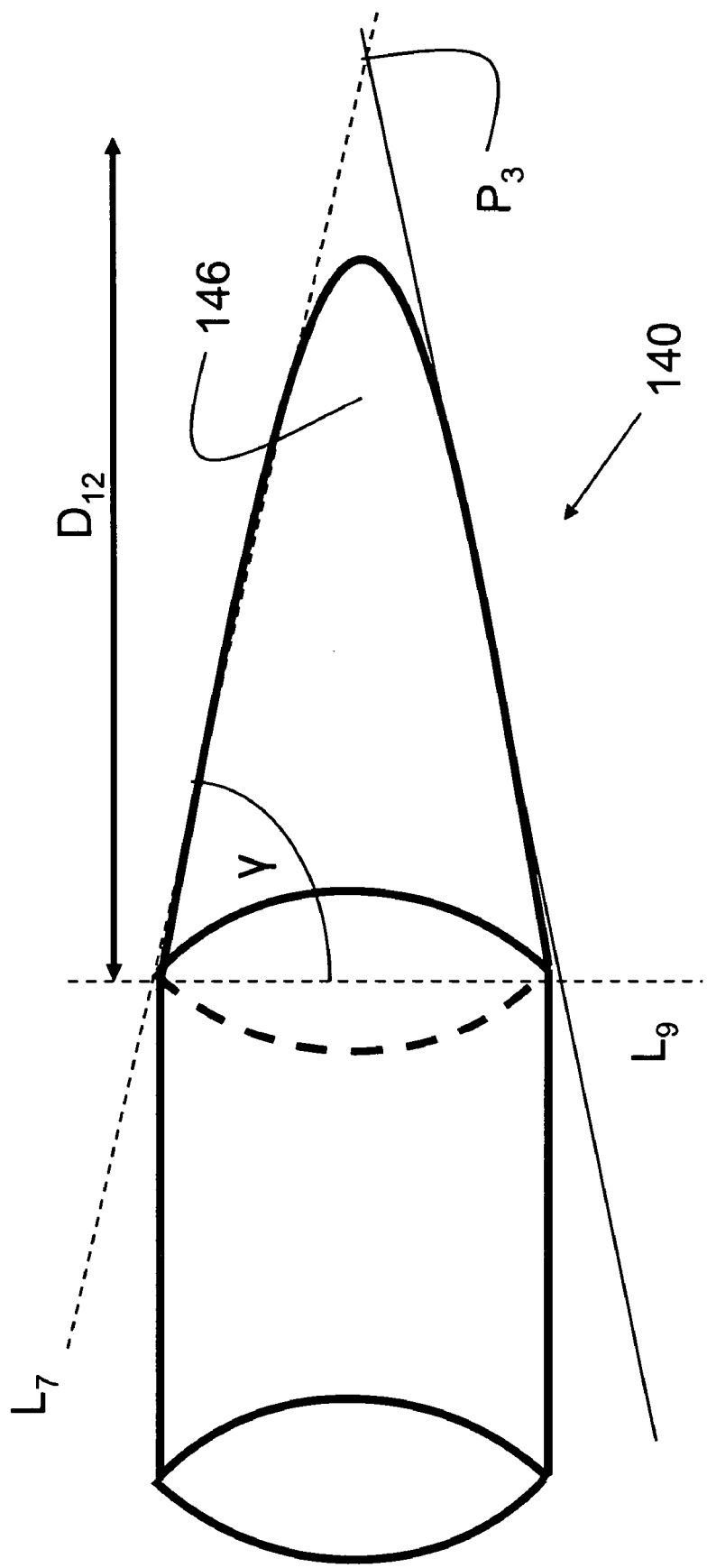
FIG. 12 is a perspective view of an aerodynamic injection element tip terminating in a rounded end.

As shown in FIG. 11, elliptical (or circular) apertures 133A, 133B, 133C may be present on injection element 130. The injection element 130 extends to a pointed tip 136. Each of apertures 133A, 133B, and 133C is configured to inject a stream of oxygen $P_D$, $P_E$, $P_F$ into the mixed stream of non-gaseous fuel and conveying gas at an angle to the axis of the oxygen lance.

Swirl-Type Injection Element Designs:

The designs presented in this section are based upon the patented Oxynator® (U.S. Pat. No. 5,356,213) concept. It is designed to minimize mixing distance and to prevent high oxygen concentrations near the pipe walls. Although there are/may be other applications of this device, it is generally used for oxygen enrichment of an air stream in a typical combustion application.

In operation, oxygen exits at a high velocity through a very narrow slit with a swirl in a radial direction, thereby improving mixing efficiency. In a particle or liquid droplet laden stream, the high flow velocity would ordinarily tend to undesirably push the particles outwards. In order to help diminish this problem, the designs below are proposed.

If two Oxynators® are to be used in succession with oxygen feeds from the oxygen lance, the design has to be slightly modified in order to allow an appropriate distribution of the oxygen flow through the different successive oxynators (i.e., an orifice allows part of the oxygen flow to pass through the upstream Oxynator®.

Figure 13:
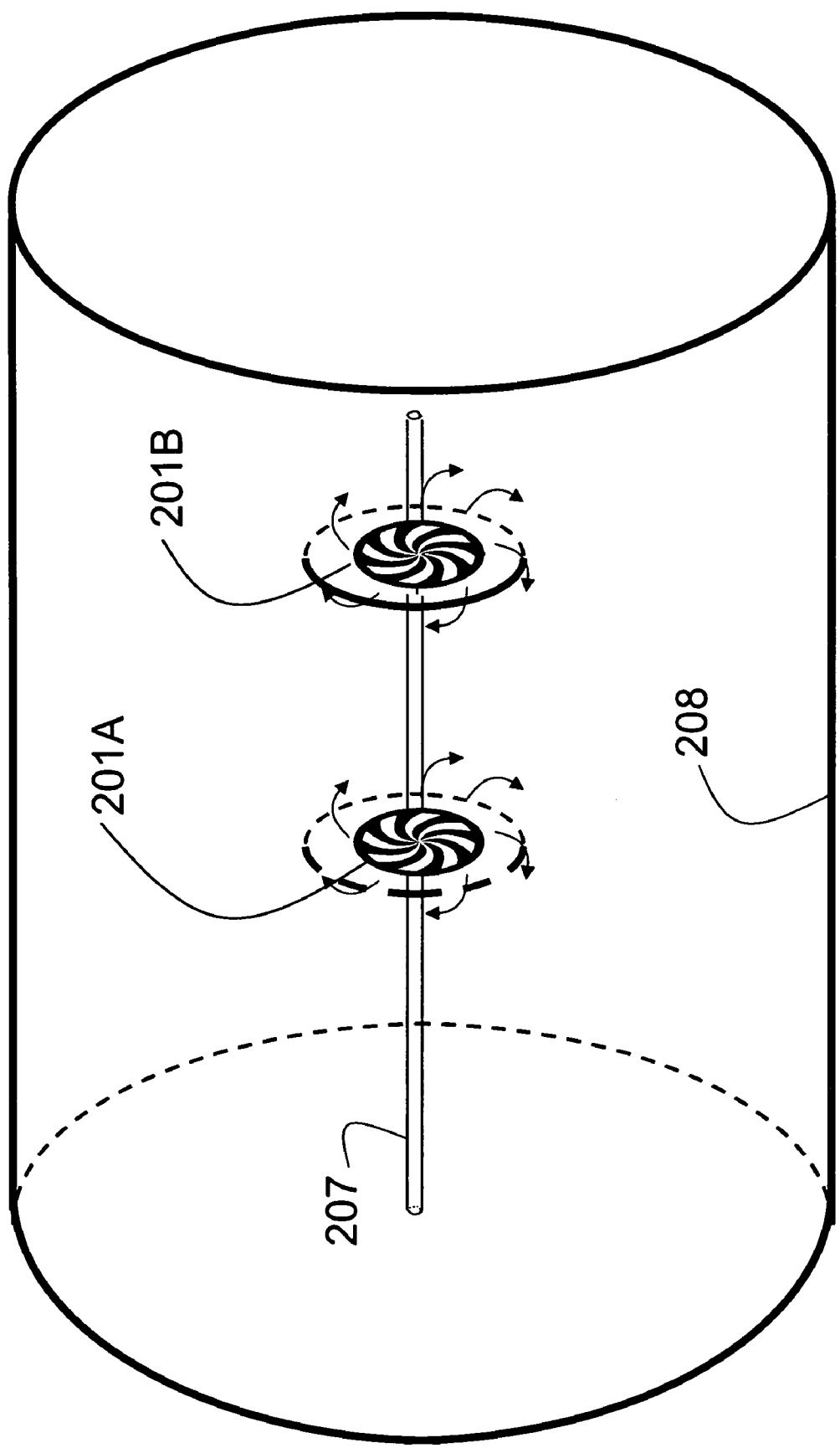
FIG. 13 is a perspective view of two injections at different axial positions using swirler-type injection elements having a same swirl directions.

As illustrated in FIG. 13, oxygen from oxygen lance 207 feeds oxygen to two injector elements 201A, 201B, both of which have the same swirl direction. It should be noted that the invention is not limited to the relative sizes of the injection elements 201A, 201B, oxygen lance 207, and fuel duct 208 depicted in FIG. 13. Each could be bigger or smaller. However, the smaller the injection elements 201A, 201B are, the less disruption to the flow of the non-gaseous fuel and conveying gas will occur. In addition, while the injection elements 201A, 201B appear to be two-dimensional objects, it should be understood that they are roughly configured as a disc with members extending in the axial direction. It should also be understood that fuel duct 208 need not extend beyond injection element 211A, 211B.

Figure 14:
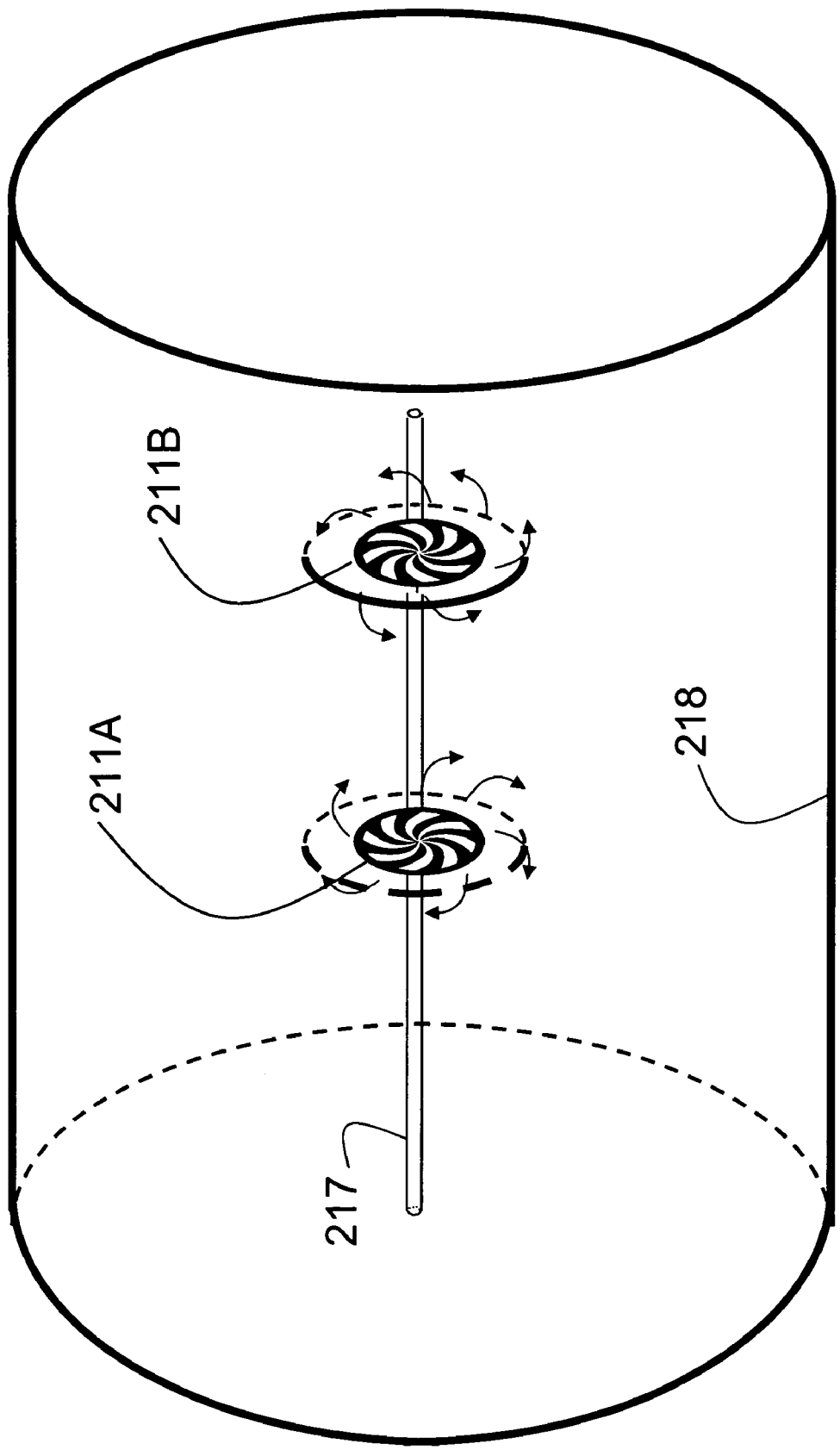
FIG. 14 is a perspective view of two injections at different axial positions using swirler-type injection elements having opposite swirl direction.

As shown in FIG. 14, oxygen from oxygen lance 217 feeds oxygen to two injector elements 211A, 211B, both of which have opposite swirl directions. This will introduce significant turbulence leading to highly efficient mixing. It should be noted that the invention is not limited to the relative sizes of the injection elements 211A, 211B, oxygen lance 217, and fuel duct 218 depicted in FIG. 14. Each could be bigger or smaller. However, the smaller the injection elements 211A, 211B are, the less disruption to the flow of the non-gaseous fuel and conveying gas will occur. In addition, while the injection elements 211A, 211B appear to be two-dimensional objects, it should be understood that they are roughly configured as a disc with members extending in the axial direction. It should also be understood that fuel duct 208 need not extend beyond injection element 211A, 211B.

With respect to industrial boilers, especially coal-fired boilers, a secondary or transition stream with respect to a fuel duct may be arranged in at least two different ways. First, they may be configured as a tube within a tube (concentrically arranged tubes). Second, they may also be configured as a plurality of tubes (secondary or transition stream) radially spaced around a circumference of a tube (fuel duct). In the invention, oxygen may be injected from the secondary or transition stream in either of these manners.

Figure 15:
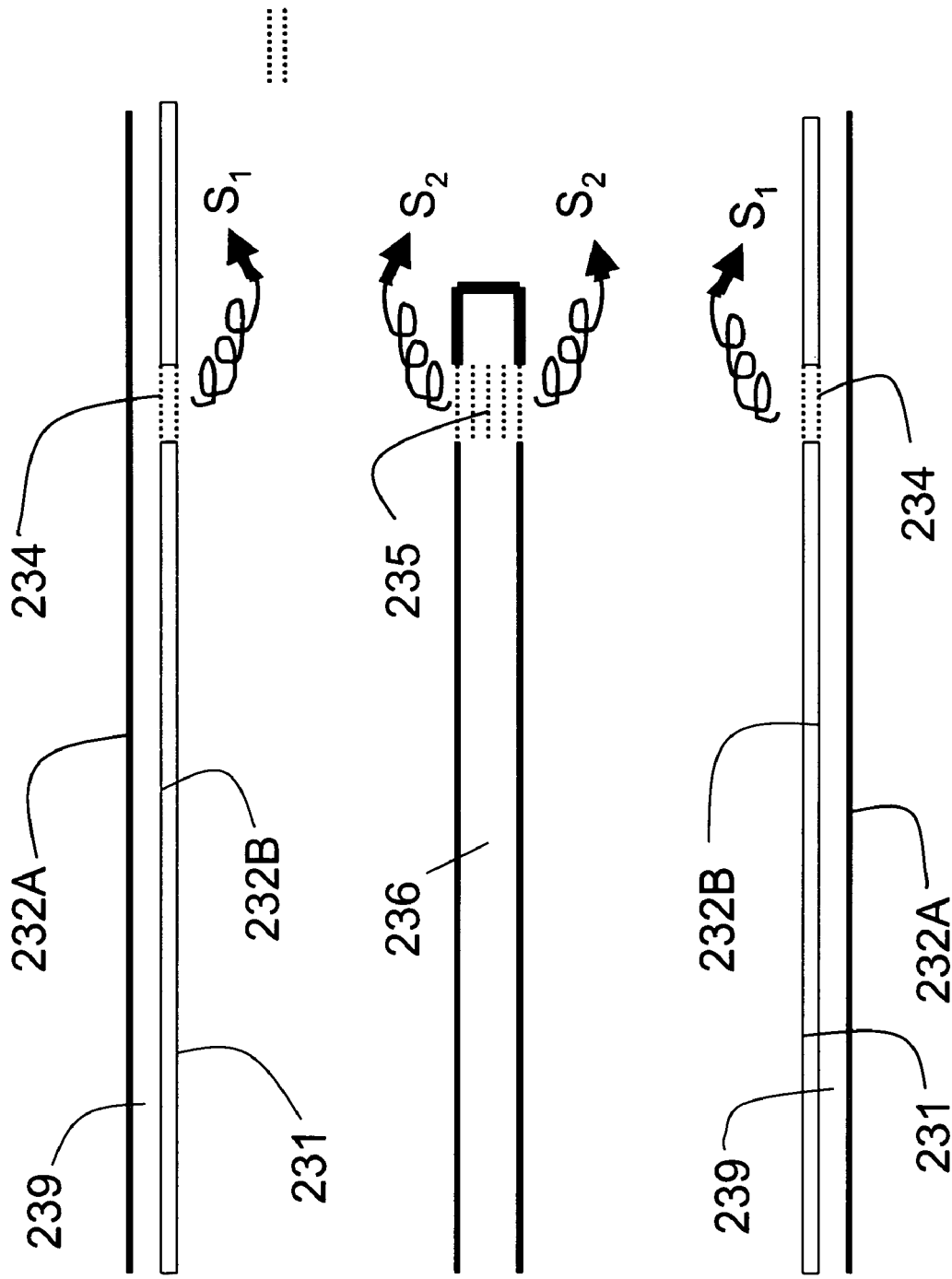
FIG. 15 is a cross-sectional view of two concentric injections with swirler-type injection elements disposed on the oxygen lance and an inner wall of the fuel duct.

With respect to the first configuration and as illustrated in FIG. 15, the arrangement of the fuel duct 231 with respect to the conduit 239 defined by walls 232A, 232B is a tube within a tube. Oxygen is fed to the central injection element 235 from oxygen lance 236. It is injected with a swirl $S_2$. Oxygen is fed from conduit 239 to the single peripheral injection element 234, which is disposed flush with the inner wall of fuel duct 231.

Oxygen is injected from the inner wall of fuel duct 231 with a swirl $S_1$ by injection element 234. The directions of swirls $S_1$, $S_2$ may the same or different. The flow passage leading to and from the peripheral injection element 234 could be aerodynamically (like a venturi) designed to cause minimum disturbance to the flow. In other words, shoulders before and after the injection element 234 could be used. It should also be understood that fuel duct 238 need not extend beyond injection element 231A, 231B.

With respect to the second configuration, the conduit 239 may actually be a plurality of conduits surrounding the fuel duct 231, any or all of which feeds injection element 234.

Figure 16A:
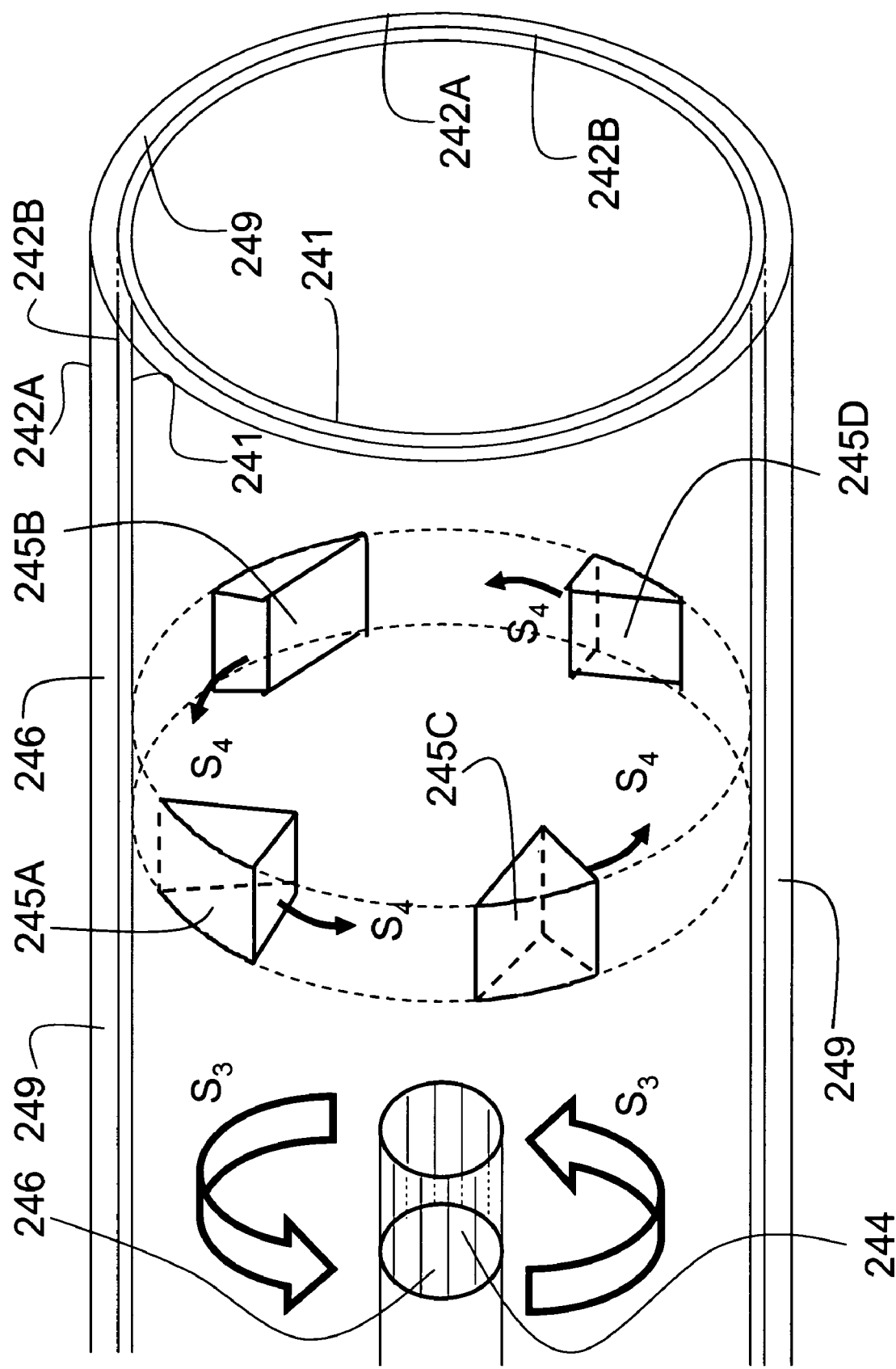
FIG. 16A is a perspective view of two injections with a swirler disposed on the oxygen lance and a tangentially injecting injection element disposed on an inner wall of the fuel duct wherein the swirl and tangential injections are generally in the same direction.

As shown in FIG. 16A, another Oxynator®-based design includes fuel duct 241 surrounded by a conduit 249 (known by those ordinarily skilled in the art as a secondary or transition stream zone) defined by walls 242A, 242B. Disposed in a central axis of fuel duct 241 is oxygen lance 244 at the end of which is an injection element 244 (based upon Oxynator®. Disposed along the inner wall of the fuel duct 241 is a plurality of tangentially injecting injection elements 245A, 245B, 245C, 245D. In operation, oxygen fed by oxygen lance 244 to injection element 244 is injected into fuel duct 241 with a swirl $S_3$. Oxygen fed by conduit 249 to injection elements 245A, 245B, 245C, 245D is tangentially injected with respect to fuel duct 241 into fuel duct 241 with a swirl $S_4$ that is in the same direction as swirl $S_3$.

Figure 16B:
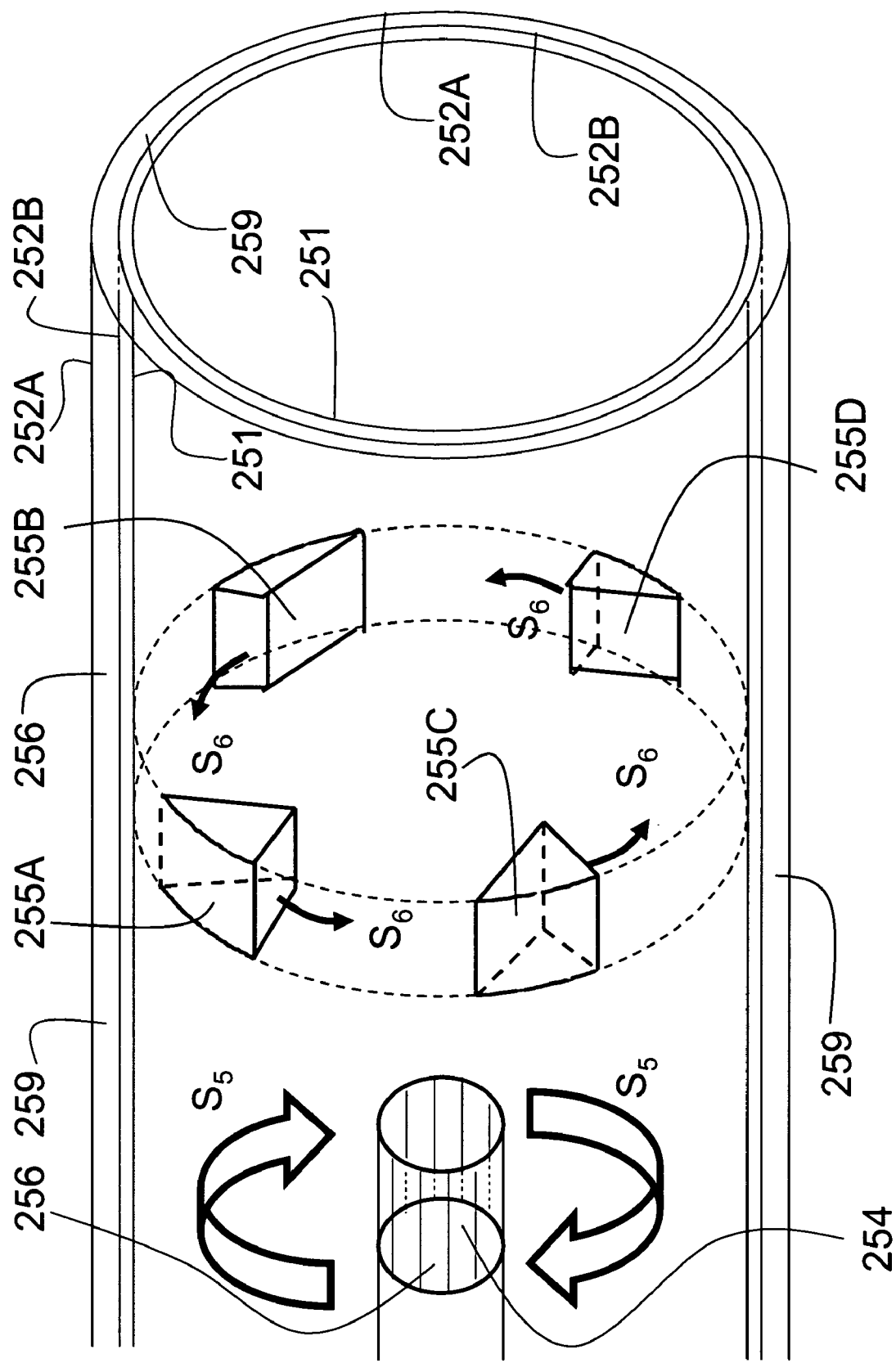
FIG. 16B is a perspective view of two injections with a swirler disposed on the oxygen lance and a tangentially injecting injection element disposed on an inner wall of the fuel duct wherein the swirl and tangential injections are generally in the opposite direction.

As shown in FIG. 16B, another Oxynator®-based design includes fuel duct 251 surrounded by a conduit 259 (known by those ordinarily skilled in the art as a secondary or transition stream zone) defined by walls 252A, 252B. Disposed in a central axis of fuel duct 251 is oxygen lance 254 at the end of which is an injection element 254 (based upon Oxynator®. Disposed along the inner wall of the fuel duct 251 is a plurality of tangentially injecting injection elements 255A, 255B, 255C, 255D. In operation, oxygen fed by oxygen lance 254 to injection element 254 is injected into fuel duct 251 with a swirl $S_5$. Oxygen fed by conduit 259 to injection elements 255A, 255B, 255C, 255D is tangentially injected with respect to fuel duct 251 into fuel duct 251 with a swirl $S_6$ whose direction is opposite that of swirl $S_5$.

Similar to the designs of FIG. 15, those of FIGS. 16A, 16B may be configured in one of at least two ways. First, they may be configured as a tube within a tube (concentric secondary or transition stream tube as depicted). Second, they may also be configured as a plurality of tubes (secondary or transition stream) radially spaced around a circumference of a tube (fuel duct).

Figure 17:
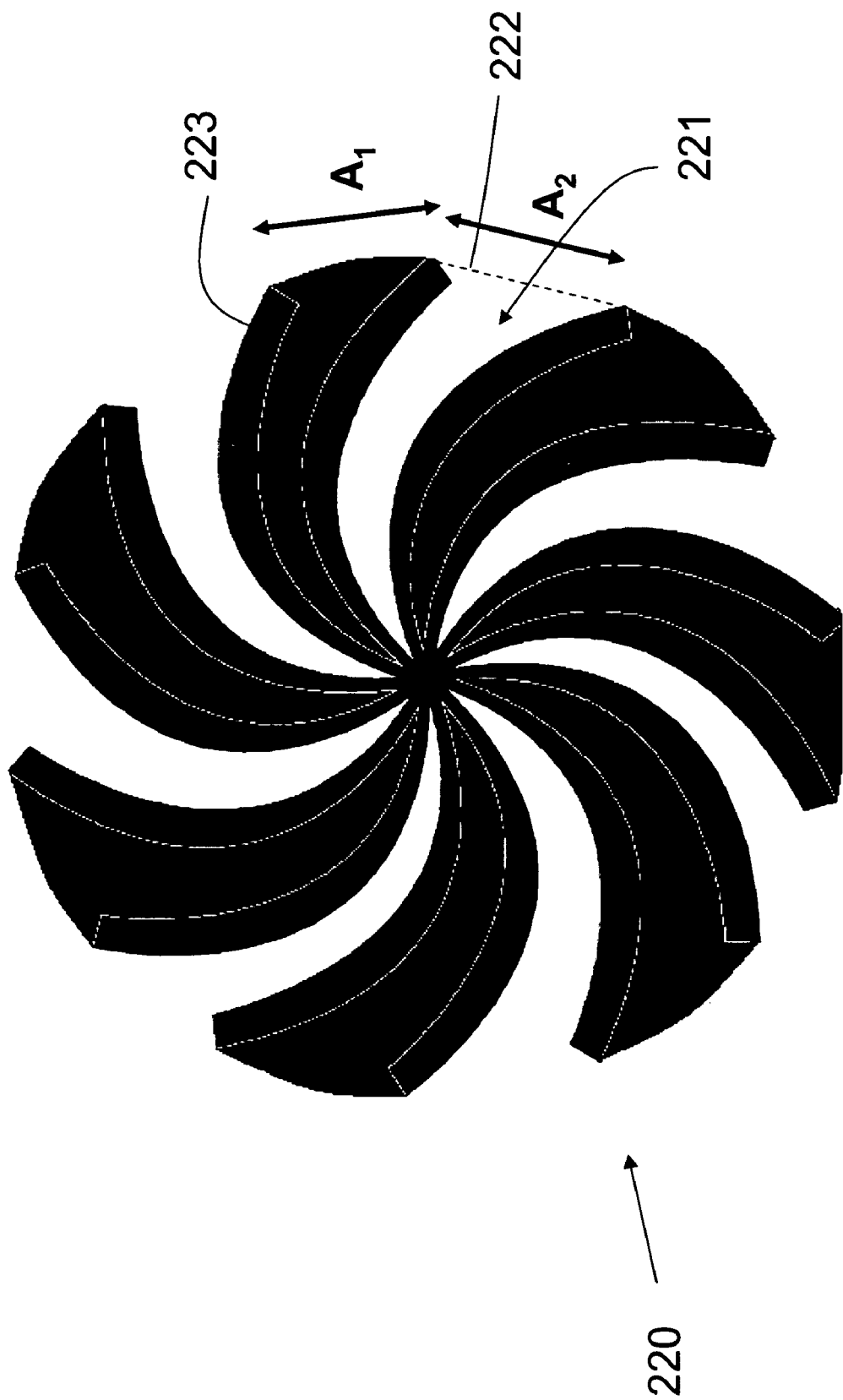
FIG. 17 is a side elevation view of a swirler showing opening and wall widths.

All of the Oxynator®-based designs of FIGS. 13, 14, 15, 16A, and 16B may be varied as follows. As depicted in FIG. 17, injection element Arc 222 along the circumferential border of open space 221 between two adjacent vanes 223 has a dimension $A_1$. On the other hand, the circumferential edge of vane 223 has a dimension $A_2$. The number of vanes 223 and the dimensions A1, and A1 may be varied in order to optimize the mixing and particle loading. The ratio of dimensions $A_1$, $A_2$ may be chosen to optimize the injection velocity and thus the penetration of the jet. A small ratio $A_2/A_1$ is preferred to minimize the disturbance to the solid phase.

Bluff Body Injection Element Designs:

Oxygen may be injected at several locations at roughly a single axial position by several different injection elements.

Figure 18:
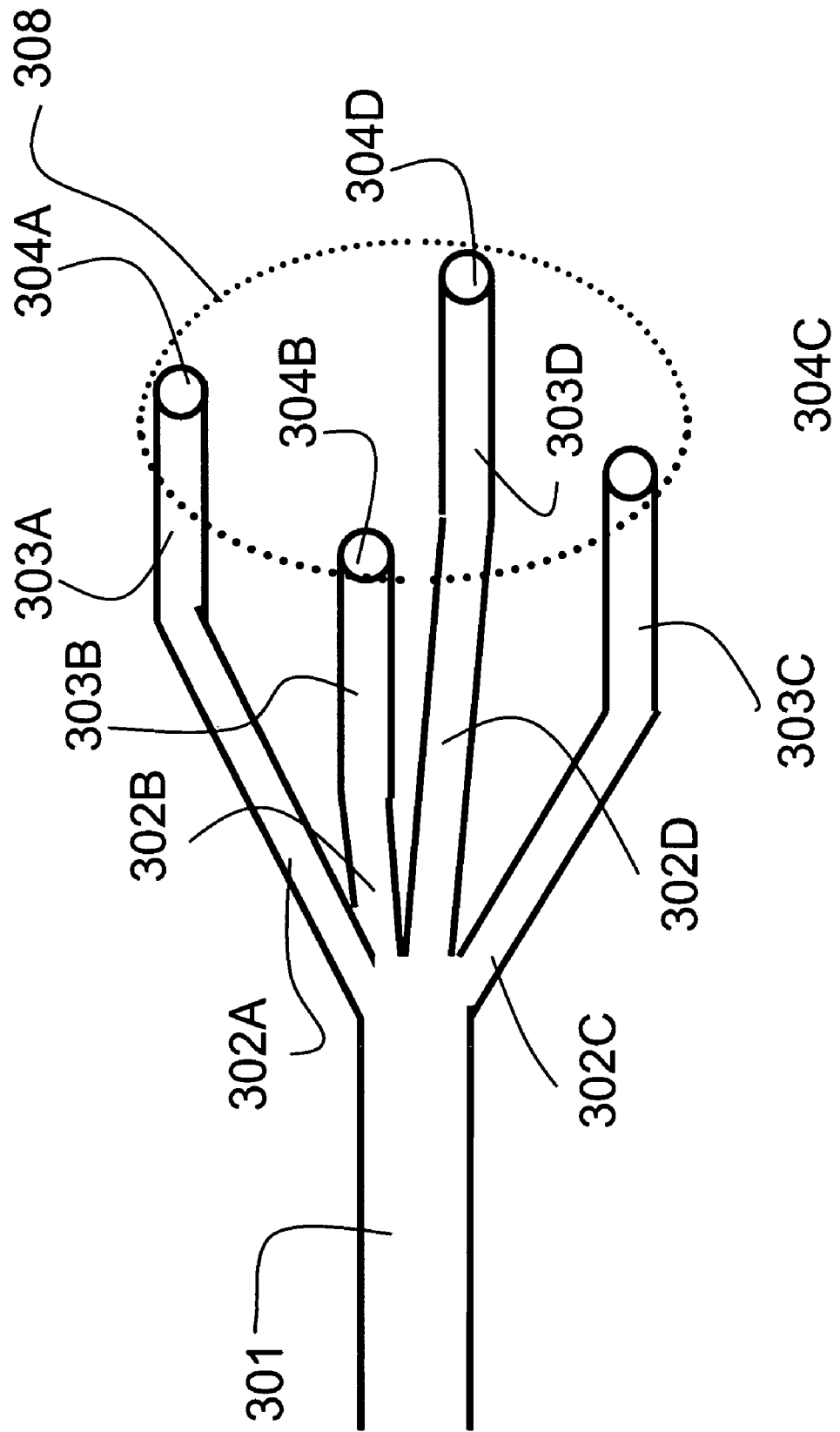
FIG. 18 is a perspective view (with the aerodynamic tip not illustrated) of four injection elements radially spaced from one another having a leg with at least one aperture at an end thereof.
Figure 19:
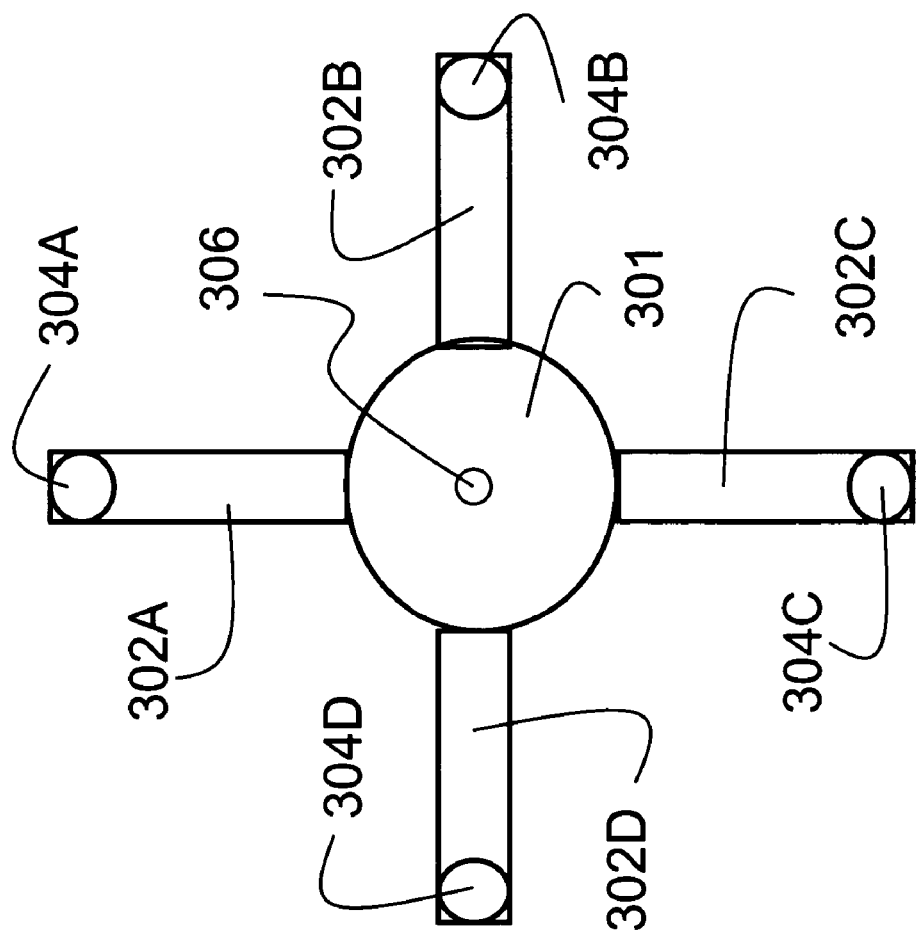
FIG. 19 is a side elevation view (with the aerodynamic tip illustrated) of the injection element configuration of FIG. 18.

As shown by FIGS. 18 and 19, extending from main oxygen lance portion 301 is an injection element comprising a leg member having first and second portions 302A, 303A and at least one aperture 304A at the end of second portion 303A. Other injection elements similarly comprise a leg member having first and second portions (302B, 303B; 302C, 303C, 302D, 303D) and at least one aperture 304B, 304C, 304D at the end of the second portions 303B, 303C, 303D. While not depicted in FIG. 19 for clarity's sake, an aerodynamic tip 306 is included at the end of lance portion 301 just after the junction between lance portion 301 and the first portions 302A, 302B, 302C, 302D.

Figure 20:
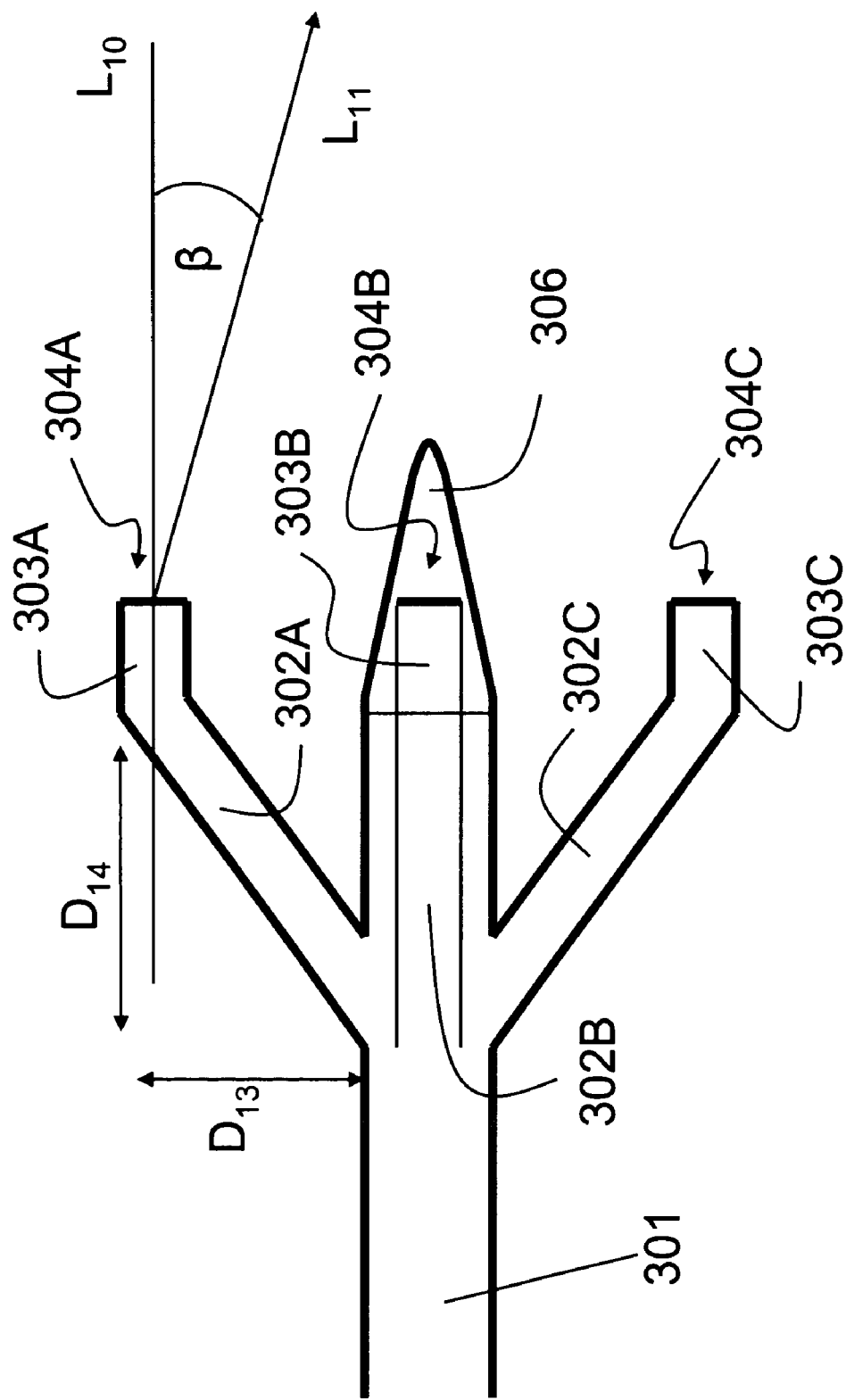
FIG. 20 is a front elevation view (with the aerodynamic tip illustrated) of the injection element configuration of FIG. 18.

As illustrated by FIG. 20, each injection element has height and length dimensions $D_{13}$, $D_{14}$. The injection elements inject oxygen into the fuel duct at an angle β with respect to an axis of the fuel duct and defined by lines $L_{10}$, and $L_{11}$. By strategically placing the injection elements of FIGS. 18-10 at various locations, mixing of the oxygen and mixed non-gaseous fuel/conveying gas is enhanced by controlling the jet momentum. The cumulative projection area of all these injection elements perpendicular to the flow area is much smaller than the flow area of the primary stream. Thus, these injection elements do not offer any significant obstruction to the flow of the particle-laden stream. In this design, the dimensions $D_{13}$, and $D_{14}$, injection angle β, and a diameter of each aperture could be independently adjusted to precisely control the oxygen penetration and local mixing.

Figure 21:
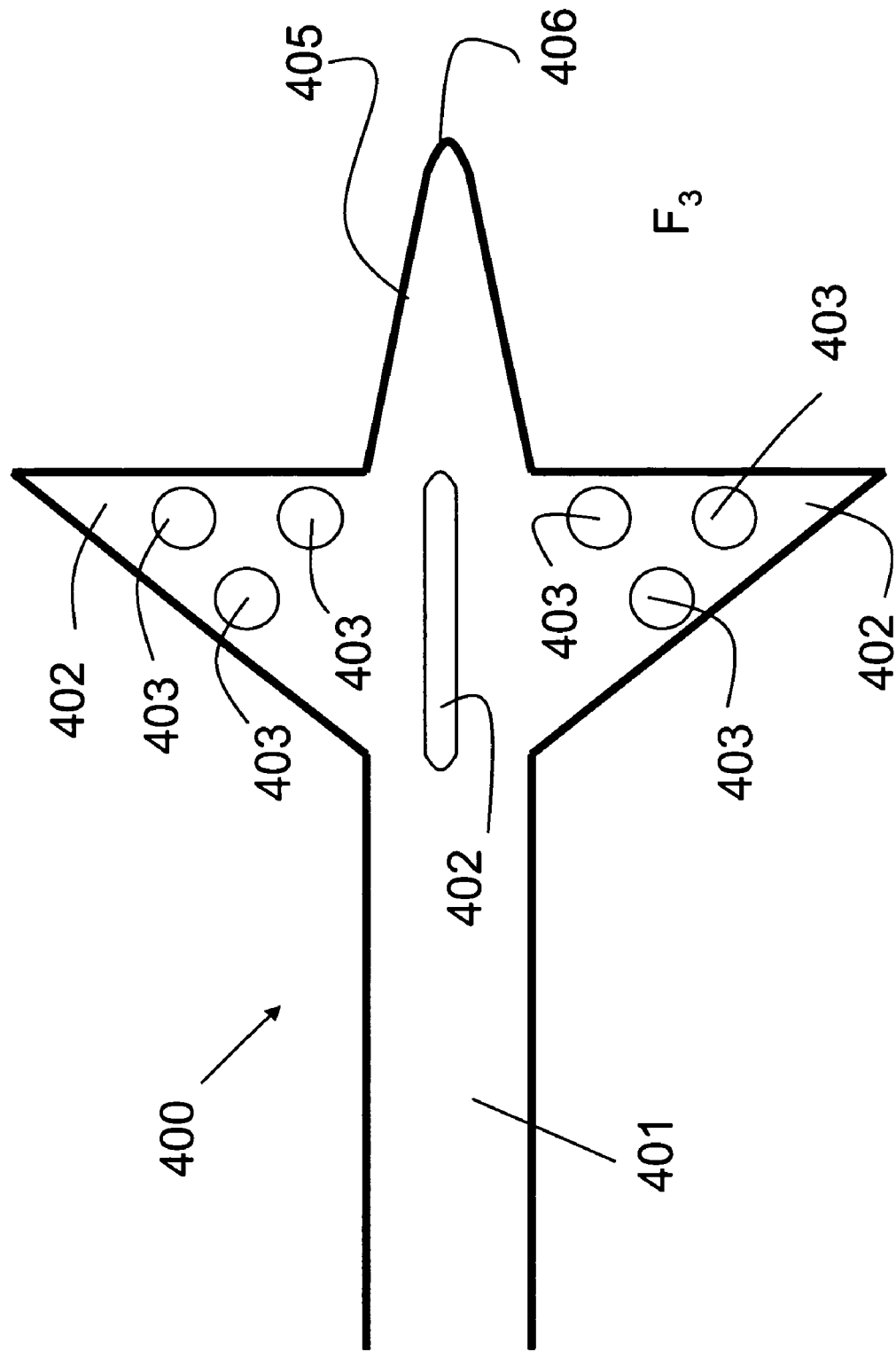
FIG. 21 is a front elevation view of a two-injection element configuration having a fin configuration.
Figure 22:
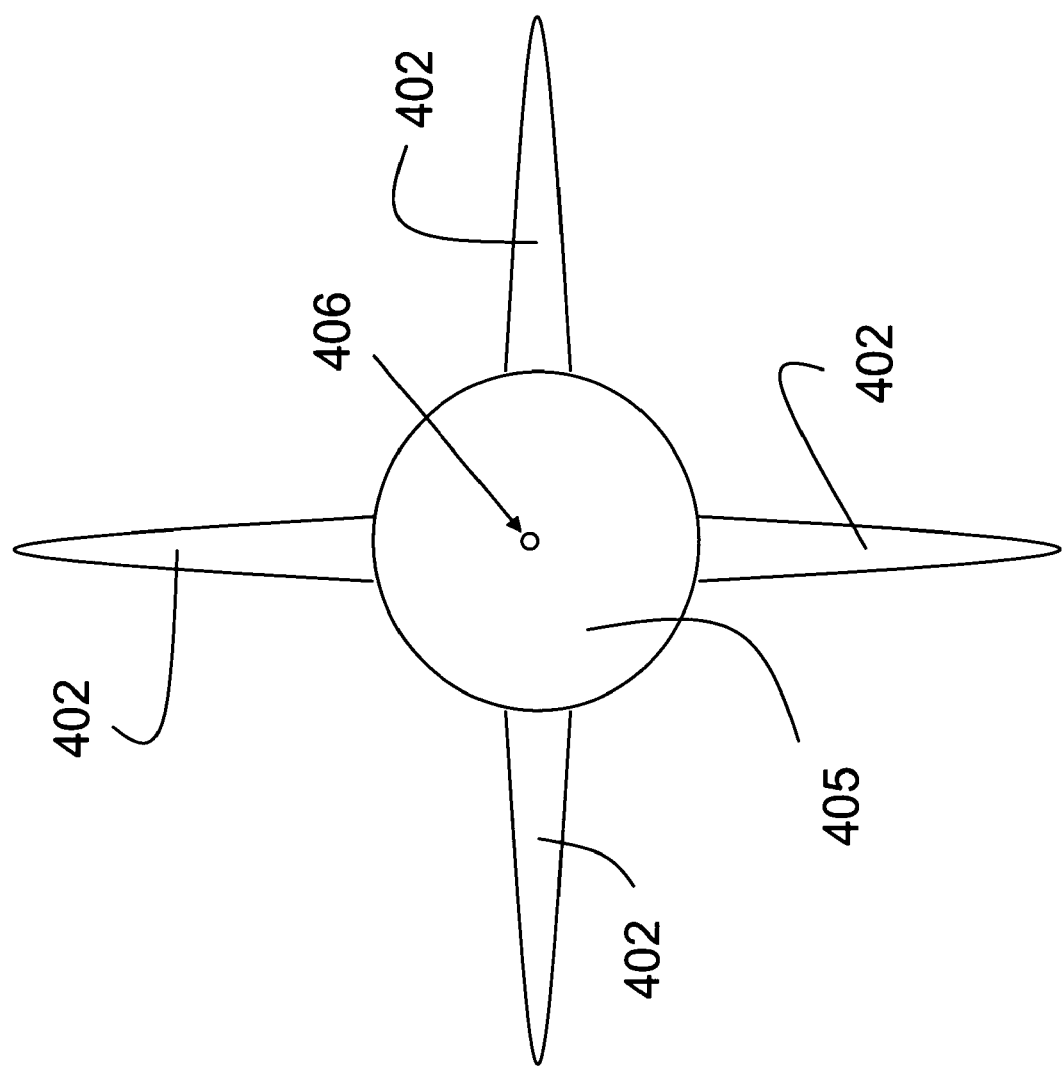
FIG. 22 is a side elevation view of the two-injection element configuration of FIG. 21.

As depicted in FIG. 21, the first and second portions are replaced with shapes that are more streamlined. Extending from a main oxygen lance portion 401 are radially spaced fins 402. The side elevation of FIG. 21 depicts a plurality of apertures 403 on surfaces of at least two fins that face in a direction perpendicular to that of the flow of non-gaseous fuel and conveying gas. However, this type of surface, an opposed surface on the other side of the fin or a surface of the fin facing downstream could have apertures 403 to introduce injection gas with precise control over the jet momentum and local penetration of the injection gas.

The lance 402 portion terminates in an aerodynamic body 405 having an aerodynamic tip 406. Each of the fins 402 is aerodynamically streamlined in shape. The apertures 403 are configured as circular holes, slots, slits, and other shaped openings such as those depicted in FIGS. 3A-3D.

In all the bluff body designs of FIGS. 18-21, the shape of any tip at the end of the oxygen lance has an aerodynamic design with or without one or more openings. The openings on the tip could be of any design previously described above.

Axially Injecting Injection Element Designs:

Another type of injection element is configured to inject oxygen axially into the flow of non-gaseous fuel/conveying gas from a surface that faces downstream. This surface could have any number of apertures of any shape. Some exemplary shapes 701A-F are best shown in FIGS. 25A-F. The number of apertures, size, shape and angle of injection could be adjusted in order to optimize mixing and solid fuel loading.

Baffles arranged near the outlet end can facilitate a uniform mixing of oxygen in the primary stream (the use of baffles is an improvement over prior art designs as it accomplishes more efficient mixing by increasing the turbulence at the outlet end). Various baffles number, shape and size may be utilized. As the velocity control of the jet outgoing from the pipe is a crucial parameter governing burner aerodynamics, the cross-sectional area of those baffles will be chosen carefully.

Figure 23B:
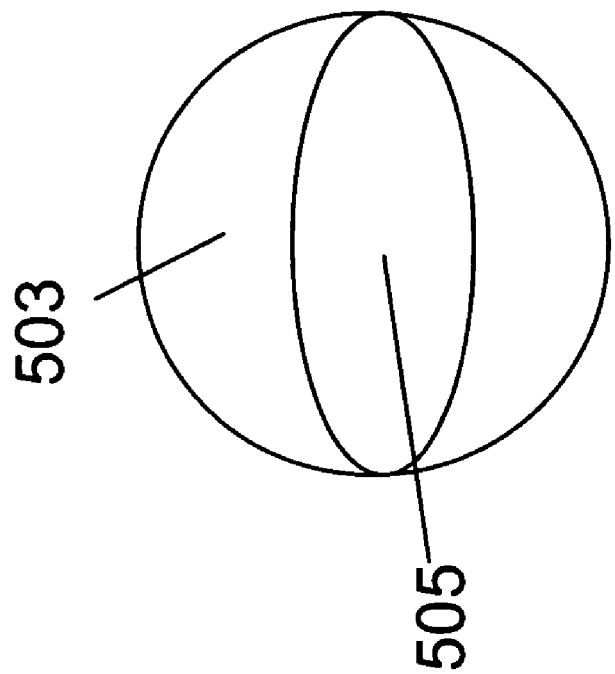
FIG. 23B is a side elevation view of an axial injection element with a horizontally oriented, elliptical cross-sectional shape.
Figure 23A:
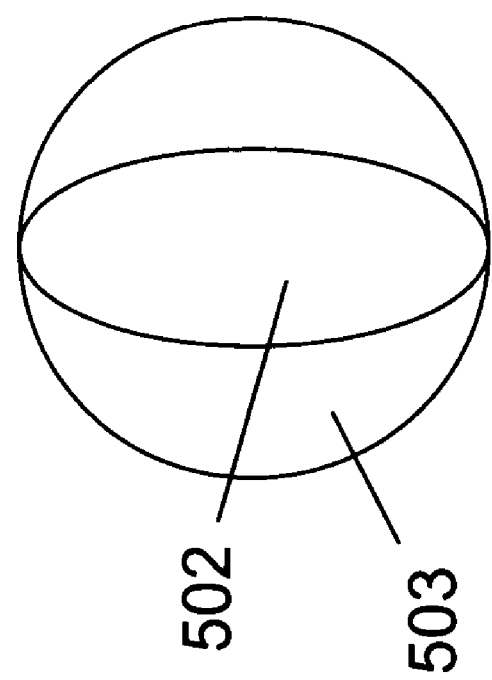
FIG. 23A is a side elevation view of an axial injection element with a vertically oriented, elliptical cross-sectional shape.

Similar types of axially injecting injection elements have a modified cross-section. As gravity has an influence on motion of the particles, a vertical elliptical cross-section, for example, will cause fewer disturbances to the particle trajectories and at the same time could provide improved mixing. Modifications of the cross-section of the pipe allow decreasing or increasing the velocity of the axial oxygen jet. As best illustrated in FIG. 23A, oxygen lance 503 terminates in a horizontally oriented elliptical end 502. Similarly, FIG. 23B depicts a vertically oriented elliptical end 505.

Figure 24:
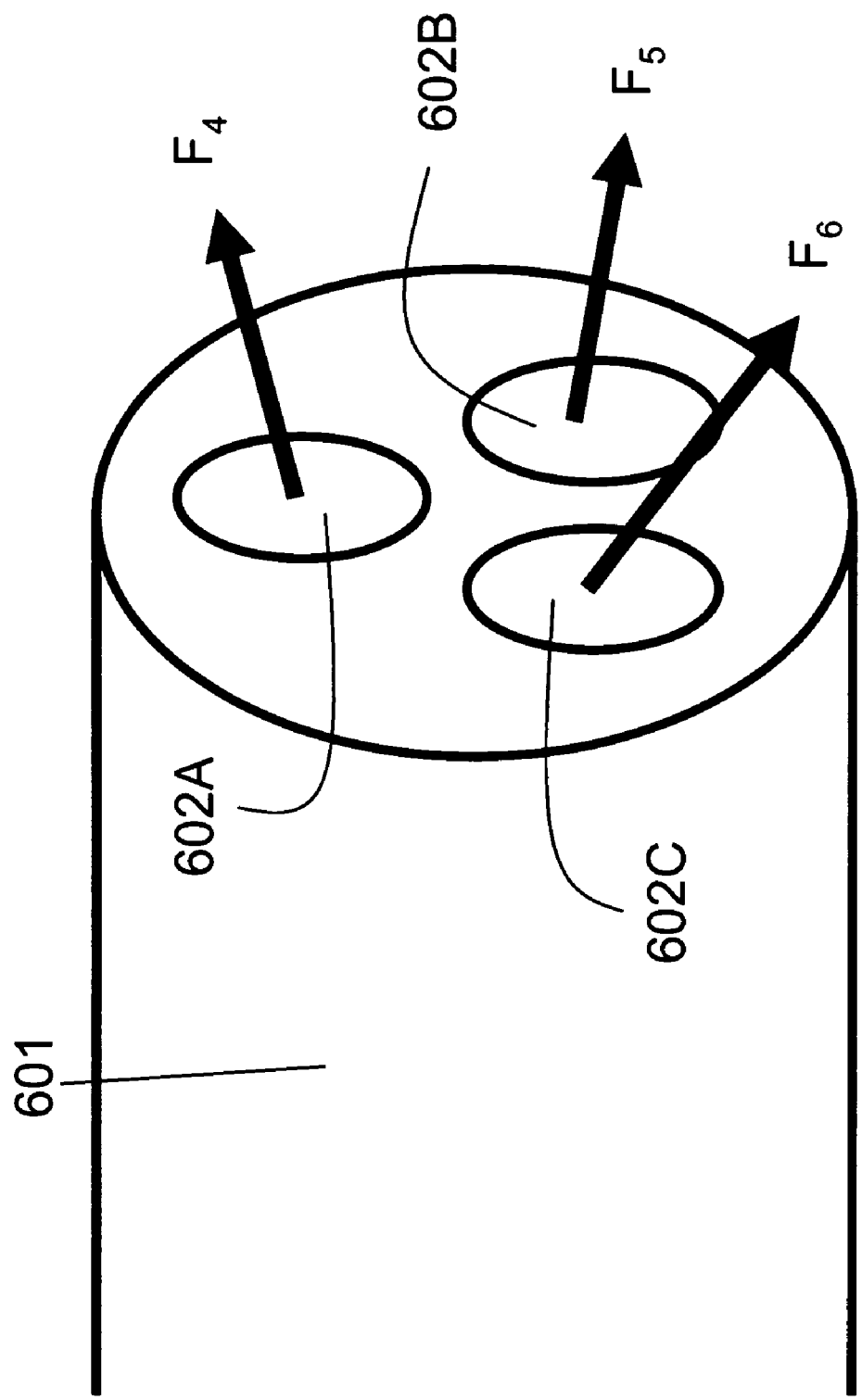
FIG. 24 is a perspective view of a tubular injection element having three radially spaced apertures at an end, thereof for injecting oxygen at an angle to the axis.
Figure 25C:
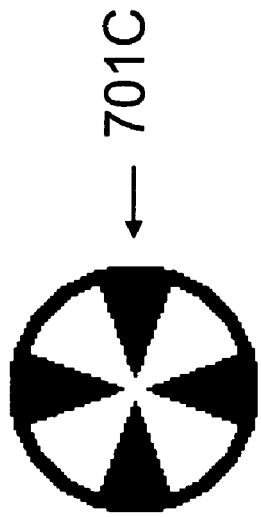
FIG. 25C is a side elevation view of a tubular injection element with a four-wedge type pattern of apertures.
Figure 25A:
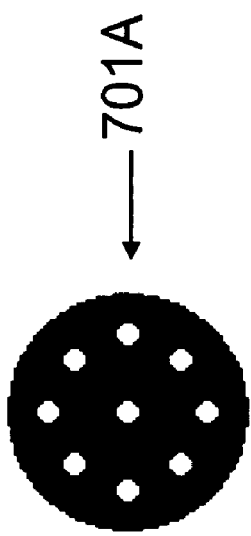
FIG. 25A is a side elevation view of a tubular injection element with apertures configured as circles arranged in a circle with one aperture in the middle.
Figure 25B:
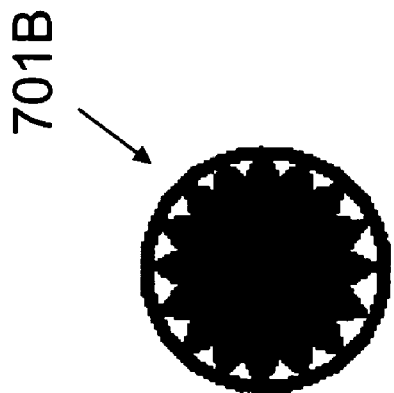
FIG. 25B is a side elevation view of a tubular injection element with a saw tooth-shape pattern of apertures at a peripheral portion thereof.
Figure 25E:
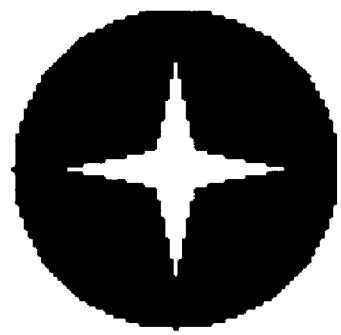
FIG. 25E is a side elevation view of a tubular injection element with a curved, cross-shaped aperture disposed at a center thereof.
Figure 25F:
FIG. 25F is a side elevation view of a tubular injection element with a curved, cross-shaped aperture similar to that of FIG. 25E but having a greater thickness and extending to a peripheral portion thereof.
Figure 25D:
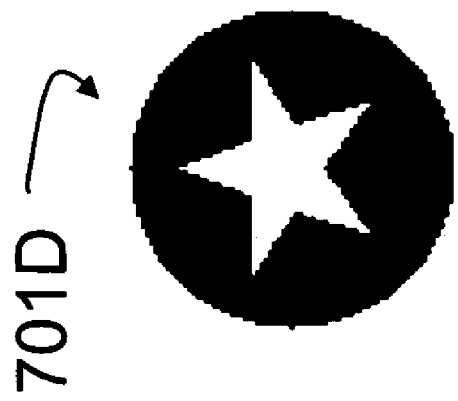
FIG. 25D is a side elevation view of a tubular injection element with a star-shaped aperture.

As depicted in FIG. 24, another axial injecting-type of injection element includes member 601 having radially spaced apertures 602A, 602B, 602C on a downstream surface. Each of apertures 602A, 602B, 602C is configured to inject flows of oxygen $F_4$, $F_5$, $F_6$ at an angle with respect to an axis of the fuel duct.

Figure 26:
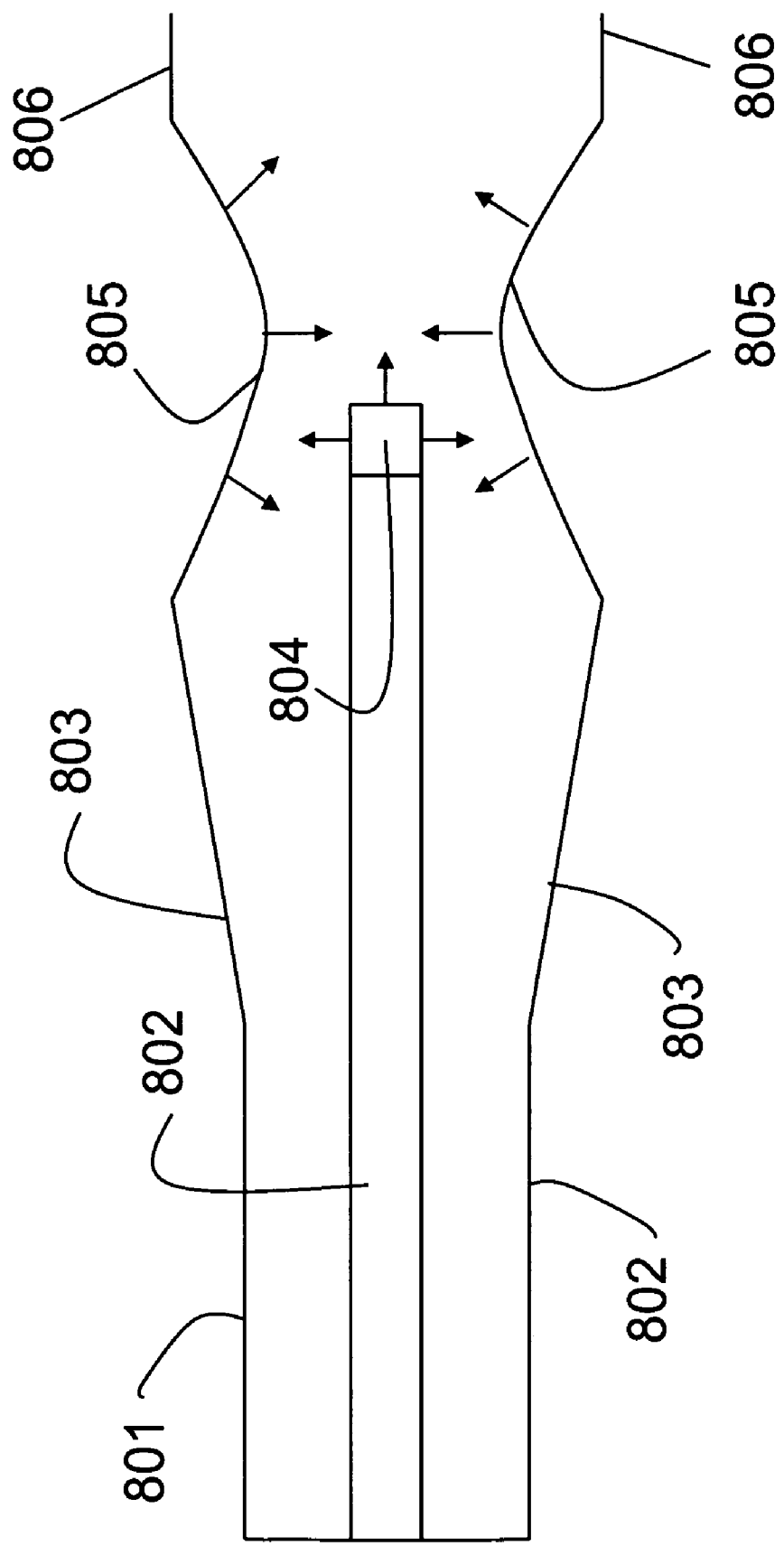
FIG. 26 is a cross-sectional view of a fuel duct having a venturi section with any one of three oxygen injections at the end of the oxygen lance and/or from various locations upon the inner walls of the venturi portion.

Variable Area/Venturi Designs:

As shown in FIG. 26, a venturi section 805 of the fuel duct 801 enhances injection of oxygen into the flow of non-gaseous fuel and conveying gas. In addition to a centrally disposed injection element 804 extending from oxygen lance 802, which terminates upstream of the narrowest constriction of the venturi section 805, oxygen may also be optionally injected at apertures in the inner wall of the fuel duct 801 at the venturi section 805. Oxygen injected from the inner wall of the fuel duct 801 may be supplied from either of the secondary or the transitions stream zones. Similar to the designs of FIGS. 13-16B, the secondary or transition stream zones may be arranged with respect to the fuel duct as a tube outside a tube or a plurality of tubes radially spaced about a circumferential surface of the fuel duct. The apertures in the venturi section 805 could be of any shape, such as circular, rectangular or other shaped slots. The degree of convergence and divergence could be varied in order to have more precise control over the momentum of the ensuing jets.

Other Considerations:

On all the previous designs, control of the three spatial components of the injection velocity could be used to optimize mixing of oxygen and carrier gas as well as particle load distribution. In addition, a forced pulsed oxygen injection can be applied to all the previous designs. Moreover, it is known as a prior art that in some specific geometrical configurations and in high Reynolds number flows (oxygen injection and/or primary stream Reynolds number), self-sustained oscillations of confined jets can occur. Oxygen injections could be designed to create and optimize pulsed jets mixing in the primary stream. The introduction of a pulsed oxygen flow in the primary air duct will force and improve the mixing of the oxygen with the carrier air and the fuel. Finally, all the above-listed concepts are specifically suitable for oxygen injection in the primary air of coal-fired low-NOx burners (LNB). Pulverized coal (PC) fired LNB (Wall or tangential fired) are of particular interest.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. An apparatus for improved mixing of oxygen and a mixture of a non-gaseous fuel and conveying gas for improved combustion in a combustion chamber, said apparatus comprising:
   a) a source of a mixture of non-gaseous fuel and conveying gas;
   b) a source of oxygen;
   c) a burner operatively associated with a combustion chamber;
   d) a fuel duct in fluid communication with said source of mixed non-gaseous fuel and conveying gas, wherein said fuel duct includes a portion that extends along an axis towards said burner;
   e) a tubular oxygen lance fluidly communicating with said source of oxygen, wherein said lance is disposed along said axis and has a diameter D; and
   f) at least first and second injection elements in fluid communication with said source of oxygen, disposed within the fuel duct and being configured to inject oxygen into, and mix therewith, a flow of said mixture upstream of, or at, said burner, wherein;
      1) said at least first and second injection elements comprises first, second, third, and fourth injection elements disposed at a same axial position along said axis;
      2) each of said injection elements comprises a leg extending outwardly and axially from said lance and at least one aperture disposed at an end of said leg facing said burner;
      3) each of said legs and said apertures are configured to receive a flow of oxygen from said lance and inject it into a flow of said mixed non-gaseous fuel and conveying gas; and
      4) each of said legs is radially spaced from one another with respect to said axis by a distance X, which is greater than the length of diameter D.

2. The apparatus of claim 1, wherein the non-gaseous fuel is a solid.

3. The apparatus of claim 1, wherein the non-gaseous fuel is coal or pet coke.

4. A method of improved combustion of oxygen and a mixture of a non-gaseous fuel and conveying gas for improved combustion in a combustion chamber, said method comprising the steps of:

a) providing the apparatus of claim 1;
b) allowing the mixture to flow into the fuel duct;
c) allowing the oxygen to flow from the first, second, third and fourth injection devices such that the oxygen and the mixture are mixed; and
d) allowing the thus-mixed oxygen, and non-gaseous fuel and conveying gas mixture to be combusted within the combustion chamber.

* * * * *